United States Patent
Huang et al.

(10) Patent No.: US 11,875,678 B2
(45) Date of Patent: Jan. 16, 2024

(54) UNSTRUCTURED VEHICLE PATH PLANNER

(71) Applicant: Zoox, Inc., Foster City, CA (US)

(72) Inventors: Zhenqi Huang, San Carlos, CA (US); Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 63 days.

(21) Appl. No.: 16/517,506

(22) Filed: Jul. 19, 2019

(65) Prior Publication Data

US 2021/0020045 A1    Jan. 21, 2021

(51) Int. Cl.
| | |
|---|---|
| *G08G 1/0968* | (2006.01) |
| *B60W 30/10* | (2006.01) |
| *G05D 1/02* | (2020.01) |
| *G08G 1/01* | (2006.01) |

(52) U.S. Cl.
CPC ....... *G08G 1/096805* (2013.01); *B60W 30/10* (2013.01); *G05D 1/021* (2013.01); *G08G 1/0125* (2013.01); *B60W 2556/50* (2020.02)

(58) Field of Classification Search
CPC ......... G08G 1/096805; G08G 1/0125; B60W 30/10; B60W 2556/50; G01S 17/931; G01S 17/89; G01C 21/3804; G01C 21/3407; G05D 1/021
See application file for complete search history.

(56) References Cited

U.S. PATENT DOCUMENTS

| | | | |
|---|---|---|---|
| 10,705,528 B2* | 7/2020 | Wierzynski | G06K 9/00805 |
| 2006/0007022 A1 | 1/2006 | Endo et al. | |
| 2006/0106534 A1 | 5/2006 | Kawamata et al. | |
| 2010/0262359 A1 | 10/2010 | Motoyama | |
| 2011/0251783 A1 | 10/2011 | Doi | |

(Continued)

FOREIGN PATENT DOCUMENTS

| | | |
|---|---|---|
| CN | 101063618 A | 10/2007 |
| CN | 108195375 A | 6/2018 |

(Continued)

OTHER PUBLICATIONS

PCT Search Report and Written Opinion dated Nov. 6, 2020 for PCT Application No. PCT/US2020/042636, 13 pages.

(Continued)

*Primary Examiner* — Donald J Wallace
(74) *Attorney, Agent, or Firm* — Lee & Hayes, P.C.

(57) ABSTRACT

An autonomous vehicle guidance system that generates a path for controlling an autonomous vehicle based at least in part on a data structure generated based at least in part on sensor data that may indicate occupied space in an environment surrounding an autonomous vehicle. The guidance system may receive a grid and generate a grid associated with the grid and the data structure. The guidance system may additionally or alternatively sub-sample the grid (latterly and/or longitudinally) dynamically based at least in part on characteristics determined from the data structure. The guidance system may identify a path based at least in part on a set of precomputed motion primitives, costs associated therewith, and/or a heuristic cost plot that indicates a cheapest cost to move from one pose to another.

21 Claims, 11 Drawing Sheets

(56) References Cited

U.S. PATENT DOCUMENTS

| | | | |
|---|---|---|---|
| 2016/0252355 A1 | 9/2016 | Mays et al. | |
| 2017/0219364 A1 | 8/2017 | Lathrop et al. | |
| 2018/0189323 A1 | 7/2018 | Wheeler | |
| 2018/0364717 A1 | 12/2018 | Douillard et al. | |
| 2018/0373941 A1 | 12/2018 | Kwant et al. | |
| 2019/0113918 A1* | 4/2019 | England | G05D 1/0274 |
| 2019/0162856 A1* | 5/2019 | Atalla | G01S 17/89 |
| 2019/0279049 A1* | 9/2019 | Doria | G06V 20/56 |
| 2020/0150235 A1* | 5/2020 | Beijbom | G01S 7/4802 |
| 2020/0401148 A1* | 12/2020 | Hong | G05D 1/0088 |

FOREIGN PATENT DOCUMENTS

| | | |
|---|---|---|
| CN | 109477723 A | 3/2019 |
| CN | 109506669 A | 3/2019 |
| CN | 109541634 A | 3/2019 |
| CN | 109990794 A | 7/2019 |
| JP | 2012215466 A | 11/2012 |

OTHER PUBLICATIONS

International Preliminary Report on Patentability for PCT Application No. PCT/US20/42636, dated Feb. 3, 2022, 8 pages.
Chinese Office Action dated May 11, 2023 for Chinese patent application No. 202080052096.X, a foreign counterpart of U.S. Appl. No. 16/517,506, 15 pages.

* cited by examiner

Cost Plot 1000A

Cost Plot 1000B

UNSTRUCTURED VEHICLE PATH PLANNER

BACKGROUND

Autonomous vehicles may rely on various pathway indicators such as runway lights, lane markings, and/or the like to navigate. However, an autonomous vehicle may fail to navigate accurately and/or efficiently when such indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings).

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 10A illustrates example values indicated by x and y locations of a cost plot at the yaw values identified in FIG. 10B.

DETAILED DESCRIPTION

Figure 1:
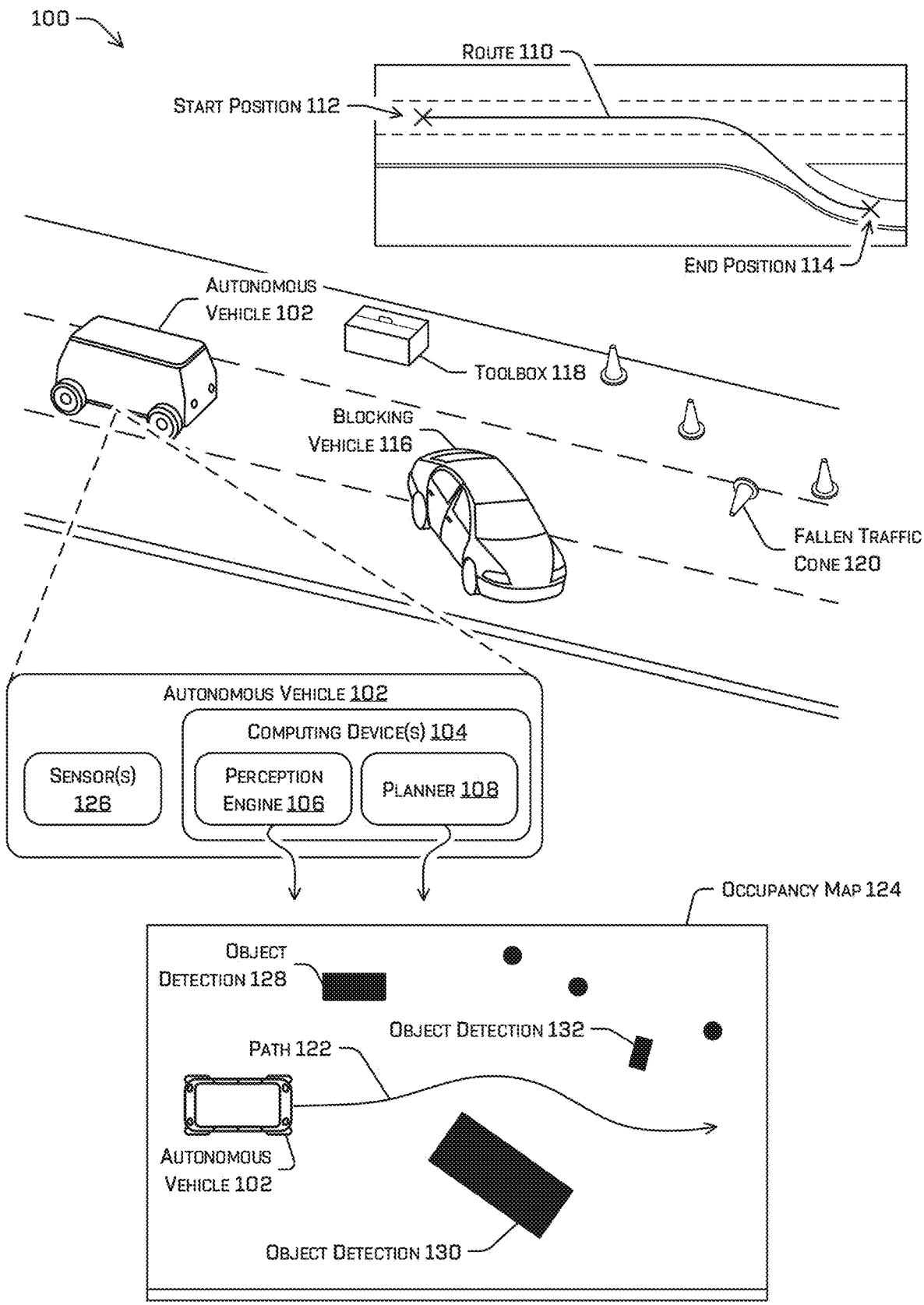
FIG. 1 illustrates an autonomous vehicle and an example scenario in which lane references (whether previously mapped or detected) may not instruct the vehicle in how to proceed.

The techniques discussed herein may comprise an autonomous vehicle guidance system that generates a path for controlling an autonomous vehicle based at least in part on an occupancy map (e.g., a map indicating occupied space and/or "free space" in an environment). An autonomous vehicle that includes the guidance system discussed herein may thereby be able to navigate accurately and efficiently, avoiding other objects, even when the environment is "unstructured" (i.e., the environment does not contain pathway indicators or the pathway indicators are degraded, obscured, and/or obsolete) such as an environment like an open field that does not include markings, a roadway, sidewalks, and/or other similar structures that may serve to identify bounds for operating an autonomous vehicle and/or in a situation where no one lane of a roadway has open space wide enough for an autonomous vehicle to operate.

An autonomous vehicle equipped with the guidance system discussed herein may detect that an indicator is unavailable (or otherwise determine that the vehicle is unable to proceed given the determined or received indications, such as a lane reference identified by a map stored in a memory accessible to the autonomous vehicle) and determine a path for controlling the autonomous vehicle based at least in part on detecting that an indicator is unavailable. Additionally, or alternatively, the guidance system discussed herein may continuously generate a contingent path that is not (at least primarily) based on an indicator substantially simultaneously as a nominative guidance system (trained to generate a path using a structure and/or an indicator) generates a path that is based at least in part on an indicator. In some examples, if the path generated by the nominative guidance system would result in a collision or is unworkable for another reason (e.g., the path would cause the autonomous vehicle to stop and/or call teleoperations) then the autonomous vehicle may use the contingent path if the contingent path is collision-free.

As used herein, a route may comprise at least a start position and an end position associated within an environment. In some examples, the start position may identify a current pose (e.g., position and/or heading) of an autonomous vehicle and/or the end position may identify a target pose of the autonomous vehicle. The route may additionally or alternatively identify one or more curves between the start position and end position and/or a vehicle pose in association with the start position and/or end position. For example, the start position may identify a location within a first lane of a roadway and the end position may identify a location within a second lane two city blocks, a right-hand turn, and an additional city block away from the start position. In other words, the route may be a high-level mission of the autonomous vehicle. As used herein, a curve may include a straight line.

The techniques discussed herein may receive a route, such as by receiving an end location (e.g., which may be specified by a remote operator and/or a passenger), determining a current position of the autonomous vehicle (e.g., based at least in part on sensor data received from one or more sensors of the autonomous vehicle, such as a global positioning sensor (GPS), lidar, radar, cameras, and the like), and determining the route between the start (current) position and an end position associated with the end location based at least in part on a map stored by the autonomous vehicle. The techniques may comprise determining, based at least in part on a map, a curve associated with at least a portion of the route. For example, the autonomous vehicle may determine the or curve based on a shape of the roadway(s) and/or free space between the start position and the end position.

The autonomous vehicle may generate a path according to the techniques discussed herein to reach the end position specified by the route. In some examples, the start position and end position discussed herein may be associated with a portion of a route. Where the route may specify the roadways and/or the like to be traveled by the autonomous vehicle, the path may specify how the autonomous vehicle will reach the end position (e.g., which lane, position within the lane, heading) over an intermediate distance (e.g., 10 meters, 20 meters, 50 meters, 100 meters). The autonomous vehicle may additionally or alternatively generate a trajectory for controlling the autonomous vehicle based at least in part on the path. The trajectory may be used by the autonomous vehicle to control motion of the autonomous vehicle over a shorter time period/distance than the path (e.g., 5 milliseconds, 10 milliseconds, 0.5 seconds) based at least in part on a receding horizon technique and a position and/or pose specified by the path. In such examples, the trajectory may comprise, for example, any one or more of waypoints and/or desired velocities, accelerations, orientations, etc. associated with the one or more waypoints.

In some examples, the techniques may comprise receiving sensor data from a sensor of the autonomous vehicle and generating an occupancy map based at least in part on the sensor data. The occupancy map may comprise a map of the environment indicating a likelihood that respective portions of the environment are occupied by an object and/or portions that are free space in which an autonomous vehicle may operate. In some examples, the occupancy map may additionally or alternatively comprise an indication of a velocity and/or heading of an object, such as may be provided by object tracking, direct velocity measurements (e.g., radar), and the like. In some instances, the occupancy map may additionally or alternatively comprise a probability associated with a location in the occupancy map (e.g., indicating a probability that the corresponding location in the environment is or is not occupied by an object).

The techniques may additionally or alternatively comprise receiving a route and generating a grid (e.g., a lattice) overlaying at least part of the occupancy map. The grid may comprise regularly or irregularly spaced nodes. In some examples, generating the grid may be based at least in part on the route. For example, the grid may comprise one or more layers of nodes, where a layer may comprise nodes orthogonal to a portion of the route associated with the layer. In other words, the nodes of the layer may lie laterally across the route (e.g., as may be constructed based on a route-relative coordinate frame). Additionally or alternatively, the guidance system may generate the grid based at least in part on a lattice structure and/or spacing. In some examples, the grid may comprise hundreds, thousands, hundreds of thousands, or any other number of nodes. The number of nodes of the grid may be based at least in part on a predefined density of the grid (e.g., nodes per unit for which a path is to be generated (e.g., next 20 meters of operation, next 10 seconds of operation)) and/or a density that is based at least in part on a velocity of the autonomous vehicle, an environment type, and/or a number of objects in the environment of the autonomous vehicle. The density may be associated with an upper bound of accuracy of the guidance system. For example, the density must be higher to control the autonomous vehicle within a 1 centimeter tolerance, but less density it required to control the autonomous vehicle within a 10 centimeter tolerance.

In some examples, the techniques may comprise sampling the grid, which may reduce the time to determine a path and/or the computing bandwidth required for determining the path. Sampling the grid may comprise selecting one or more layers of the grid and/or selecting one or more nodes of a layer. In at least one example, sampling the grid may comprise determining a portion of the occupancy map that is associated with a change of topology (e.g., shape of the object detections identified by the occupancy map) that meets or exceeds a threshold change and selecting a layer, as a sample layer, that is associated with the portion of the occupancy map that meets or exceeds a threshold change. In some examples, a layer may be associated with a characterization of the occupancy map that indicates a number, density, distribution, and/or the like of occupied nodes indicated by the occupancy map.

In some examples, the sampled layer may comprise a plurality of nodes (e.g., edges) and the sampling may additionally or alternatively comprise sampling the sampled layer. Sampling the sampled layer may comprise selecting a subset of the plurality of nodes of the sampled layer based at least in part on a predetermined number of the plurality of nodes, determining one or more of the plurality of nodes that are collision-free, and/or selecting a subset of nodes that are spaced according to a sample rate. Sampling a layer may be termed "lateral sampling."

Once a grid has been generated over the occupancy grid and/or the grid has been sampled, the techniques may comprise searching for a path though the (sampled) nodes of the grid between the start position and the end position and/or end layer associated with the end position. In some examples, searching for the path may comprise searching for a contiguous set of connections between nodes of different layers of the grid. The search for the path from the start position to the end position may comprise determining a contiguous set of connections between nodes from the end position to the start position or, in other examples, from the start position to the end position. In some examples, the search may be configured with a ruleset that may comprise one or more rules, e.g., specifying a boundary within which to determine the path (e.g., the boundary may be determined based at least in part on sensor data and/or a map), node connection rules (e.g., nodes of a same layer may not be connected where a layer comprises nodes that are disposed laterally to the route), and/or the like. In some examples, the search may comprise determining a directed graph between (sampled) nodes of the grid. The directed graph may comprise a connection (e.g., edge) between a first node and a second and/or weight (e.g., cost) associated with the connection.

In some examples, the search may be based at least in part on the occupancy map, a set of motion primitives (e.g., template movements of possible movements of the autonomous vehicle), and/or a cost plot (which, at least in some examples, may be associated with the respective motion primitives). In some examples, the one or more motion primitives may be precomputed (e.g., generated before the autonomous vehicle is operating to accomplish a mission) and stored in a memory accessible to the autonomous vehicle at run-time. A motion primitive may comprise an indication of steering controls, position of the autonomous vehicle, acceleration, and/or velocity of the autonomous vehicle, where feasibility may be dependent on the control systems and/or structure of the autonomous vehicle and/or the velocity, acceleration, passenger comfort (e.g., upper and/or lower bound(s) of velocity and/or acceleration that are predefined), and/or other kinematic effects, such as surface friction, drag, body roll, etc. For example, a motion primitive may model a position and/or orientation of an autonomous vehicle responsive to throttle and/or steering controls.

Precomputing one or more motion primitives may comprise generating tens, hundreds, or thousands (or any other number) of curve(s) (e.g., cubic spiral, polynomial, Bezier, clothoid, etc.) associated with feasible movements of an autonomous vehicle. In some examples, precomputing the one or more motion parameters of the cubic spirals may comprise iteratively generating different curves with different parameters based at least in part on a density and/or one or more bounds (e.g., an arc length, a maximum curvature, a velocity and/or velocity range associated with a maximum curvature). In some examples, the autonomous vehicle may receive one or more motion primitives, which may comprise interpolating between two or more motion primitives of the set of motion primitives. In such examples, the number of pre-generated primitives may be reduced at the expense of a less computationally accurate primitive (e.g., based on interpolation). In an additional or alternate example, a motion primitive may be precomputed based at least in part on output generated by a machine-learned model trained to generate steering commands based at least in part on being trained using steering commands generated by human and/or simulated human drivers and/or inferred from observation of human drivers. For example, the steering commands used as training data may be received from a sensor that captures human driver input to a vehicle and/or determined based at least in part on inferring steering commands from sensor data that includes vehicle behavior, such as a traffic camera feed, sensor data captured by an autonomous vehicle of other vehicles on a roadway, and/or the like.

In some examples, the cost plot may be precomputed and stored in a memory accessible to the autonomous vehicle at run-time. The cost plot may have dimensions that correspond to potential poses of the autonomous vehicle in the environment in which the autonomous vehicle is operating in reference to a reference pose of the autonomous vehicle. For example, a first location (first cell) in the cost plot may indicate a longitudinal displacement, a lateral displacement, and/or a heading displacement (e.g., a first pose) with reference to a reference pose (e.g., which may be indicated by the origin of the cost plot) and a minimum cost for achieving the longitudinal, lateral, and/or heading displacement from the reference pose. Precomputing the first cost associated with the first cell may comprise determining one or more subsets of motion primitives that connect the reference pose to the first pose, determining a cost in association with each of the subset of motion primitives, and determining a subset of motion primitives (e.g., the subset may comprise one or more motion primitives) associated with a minimum cost from among the costs determined in association with the one or more subsets of the motion primitives.

In various examples, a path may be determined based at least in part on determining all connections between all nodes in the region and searching for a set of connections therebetween which provide a total minimum cost, which may comprise the costs associated with each motion primitive determined on that path. In at least some examples, such connections may be limited to only those connections between nodes which are feasible. In additional and/or alternate examples, computational resources may be reserved based at least in part on informing a search direction without enumerating all possible connections. Such examples, as described in detail below, may select successive nodes for exploration based on determining those nodes which connect to a previously identified node having the lowest cost of all nodes connected thereto in addition to a heuristic cost based on the distance to the target. Additionally, it is understood, that such connections need not be limited to nodes in successive layers. As a non-limiting example, such a path search may comprise searching nodes between a first layer and any one or more of a second layer, a third layer, a fourth layer, and so on.

In some examples, before conducting a full search for a path, the techniques may comprise determining if a previous path and/or previous connection determined by the guidance system is feasible (e.g., satisfies current constraints such as velocity, maximum steering angle, and/or boundaries; is collision-free; has a cost that is less than a cost threshold).

In some examples, the search for a path may comprise determining a connection between a first node of a first layer and a second node of a second layer based at least in part on the cost plot, the set of motion primitives, and/or the occupancy map. Note that the first node and/or the second node may be sample nodes and the first layer and/or the second layer may be sample layers. A connection may identify the first node as a predecessor to the second node, the second node as a successor to the first node, a motion primitive associated with the first node and the second node, and/or a cost associated with the connection. Determining the connection may comprise determining, based at least in part on the cost plot, that the second node is associated with a cost that is less than a threshold cost and/or is a minimum cost compared to costs associated with the other nodes in the second layer. Based at least in part on this determination, the search may comprise determining whether there is a motion primitive, of the set of motion primitives, that is collision-free between the first node and the second node. If there is a collision-free primitive, the search may identify the collision-free primitive as part of the connection between the first node and the second node and/or the search may determine a cost associated with the collision-free primitive. If the cost of the primitive meets or exceeds a cost threshold or if no collision-free primitive is identified between the first node and the second node, the search may determine a third node in the second layer that has a next-highest cost and/or the search may trigger re-sampling the grid based at least in part on an iteration count by which the search has not identified a collision-free and/or low-cost path (e.g., low cost may be defined as being below a threshold cost).

The search may iteratively identify nodes to explore for collision-free and/or low-cost motion primitives based at least in part on the cost plot and/or the set of motion primitives, as described above until the search determines a path between the start position and the end position or until the search explores each node of a layer and determines that all nodes of the layer are associated with invalid (collision-causing) and/or high cost (meeting or exceeding the cost threshold) motion primitives. In the latter instance, the search may remove one or more of the last connection(s) from the path, identify a set of nodes to exclude from the search, and/or re-search for a different connection between the previous layers. If this has already been done and the nodes of the n previous layers have been searched with the same result, the search may output a failed state and/or transmit a request for remote assistance, where n is a positive integer.

In additional or alternate examples, the techniques may comprise an alternate search strategy, which may comprise attempting to connect less than all the nodes, for example, by determining one or more nodes to which a current node is connected based at least in part on a set of motion primitives (the current node being defined by last node reached by the search, which may be the start node or a node of the end layer at the beginning of the search), attempting to connect nodes that are within a threshold distance of a tangent of the route, by increasing a threshold change associated with layer sampling (e.g., thereby reducing a sensitivity of the layer selection to changes in topology in the occupation map), and/or reducing a sample rate so that less nodes of a layer will be sampled thereby reducing the set of nodes to be connected, and/or iteratively expanding the number of nodes for which a connection is attempted based at least in part on failing to connect a node and/or failing to determine a feasible path (e.g., by increasing the sample rate, decreasing the threshold change for sampling layers (e.g., making the layer sampling more sensitive so that more layers are sampled). In some instances, the techniques may comprise continuing to search for a lower cost path until a total cost associated with the generated path is below a threshold cost, until a difference between the final position and/or pose from the target position and/or pose is less than a threshold difference, and/or until a predefined number of iterations has been reached.

The techniques may comprise determining a total cost of a path based at least in part on the costs associated with the contiguous set of contiguous connections making up the path. In some examples, the cost associated with a connection may comprise a cost indicated by a cost plot and/or may be based at least in part on: a cost associated with the motion primitive connecting the first node to the second node (e.g., the greater the curvature of the motion primitive, the higher cost), a cost associated with a safety margin (e.g., higher cost for bringing the autonomous vehicle closer to an object, may depend on the velocity and/or other kinematics), a cost associated with a difference between the ending position and/or pose associated with a terminus of the motion primitive and a target position and/or pose, a cost associated with a starting position and/or pose of the autonomous vehicle (e.g., a cost associated with a position and/or pose associated with a beginning of the motion primitive and/or the first node and/or a difference between a position and/or pose associated with the first node and the starting position and/or pose), a cost associated with a difference between a motion primitive connecting a first layer and second layer and a motion primitive connecting a previous layer to the first layer, and/or the like. In some examples, at least one of the costs may be based at least in part on a difference between a motion primitive and output generated by a machine-learned model trained to generate steering commands based at least in part on being trained using steering commands generated by human and/or simulated human drivers and/or inferred from observation of human drivers.

The guidance system discussed herein may identify a path as feasible and/or determine a confidence score based at least in part on the costs discussed herein. The guidance system may output the path and/or confidence score, which the autonomous vehicle may use to control motion of the autonomous vehicle, e.g., by generating a trajectory based at least in part on the path. In some examples, the guidance system may output a primary path and/or a contingent path. For example, the guidance system may determine the contingent path based at least in part on generating a set of candidate paths, determining that the set comprises two groups of candidate paths based at least in part on a threshold distance (e.g., the two groups may be two distinct homotopic groups), and selecting a primary path from a first group and a contingent path from the second group. In some examples, the primary path may be selected as the primary path based at least in part on determining that the primary path is associated with a first total cost that is less than a second total cost associated with the contingent path. The primary path may be associated with a first total cost and/or the contingent path may be associated with a second total cost that is/are less than a cost threshold and/or may be minimum costs of the respective groups associated therewith.

Example Scenario

FIG. 1 illustrates an example scenario 100 including an autonomous vehicle 102 comprising the guidance system discussed herein. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to path-finding in video games, manufacturing, augmented reality, etc.

The autonomous vehicle 102 may comprise computing device(s) 104 that may include one or more ML models and/or the guidance system discussed herein. For example, the computing device(s) 104 may comprise a perception engine 106 and/or a planner 108, which may comprise one or more ML models and may be parts of the guidance system discussed herein. For example, the perception engine 106 and/or the planner 108 may comprise the hardware and/or software for conducting the operations discussed herein related to the guidance system. The guidance system may comprise more or less components, but the perception engine 106 and/or planner 108 are given as a non-limiting example for the sake of comprehension.

In some examples, an ML model may comprise a neural network such as, for example, a convolutional neural network (CNN). As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters. Although discussed in the context of neural networks, any type of machine-learning can be used consistent with this disclosure.

In some examples, the guidance system discussed herein and/or an ML model may comprise processor-executable instructions stored in a memory of the computing device(s) 104 and/or accessible thereto, hardware, and/or some combination thereof (e.g., a field-programmable gate array (FPGA), application-specific integrated circuit (ASIC)).

In the example scenario 100, the autonomous vehicle 102 has received and/or determined a route 110 defining a start position 112, an end position 114, and a curve between the start position 112 and the end position 114 (note that the curve comprises a straight line and/or one or more curves). For example, the planner 108 may have determined the route 110 based at least in part on sensor data and an end position received as part of a mission (e.g., from a passenger, from a command center). As used herein, references to a "position" may comprise both a location and/or a pose (e.g., position and/or orientation/heading of the vehicle).

As the vehicle operates to reach the end position 114, the autonomous vehicle 102 may encounter a scenario like example scenario 100 in which a planner that is reliant on a lane reference (e.g., determined based at least in part on a map and/or localizing the autonomous vehicle 102) to generate a path may not accurately and/or efficiently generate a path. For example, a variety of objects (e.g. a blocking vehicle 116, toolbox 118, and fallen traffic cone 120) cumulatively block all three lanes of the depicted roadway, which may cause another planner to stop the vehicle and/or call teleoperations because no one lane has sufficient room for the autonomous vehicle.

However, the guidance system discussed herein may generate a path 122 based at least in part on an occupancy map 124 generated from sensor data captured by sensor(s) 126. The autonomous vehicle 102 may receive sensor data from sensor(s) 126 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated lidar and/or radar points, time of flight data, an image (or images), an audio signal, and/or bariatric or other environmental signals, etc.

In some examples, the perception engine 106 may include one or more ML models and/or other computer-executable instructions for detecting, identifying, segmenting, classifying, and/or tracking objects from sensor data collected from the environment of the autonomous vehicle 102. In some instances, the perception engine 106 may generate occupancy map 124 based at least in part on the sensor data. The occupancy map may comprise an indication that a location within the environment is occupied by an object and/or is otherwise unavailable to the autonomous vehicle 102 for operation and/or an indication that another location within the environment is "free space"—a location that is unoccupied by an object and/or at which the autonomous vehicle may operate. In some examples, the occupancy map may additionally or alternatively comprise a probability calculated by the perception engine 106 that a respective location is unoccupied or is occupied.

For example, the occupancy map 124 depicted in FIG. 1 may comprise a first portion indicated as being occupied and corresponding to an object detection 128 generated by the perception engine 106 associated with the toolbox 118. Similarly, other portions of the occupancy map 124 indicated as being occupied may correspond with an object detection 130 associated with the blocking vehicle 116 and an object detection 132 associated with the fallen traffic cone 120 (and the other traffic cones which are not numerated for clarity), otherwise the occupancy map 124 indicates the rest of the environment (within the bounds of the occupancy map 124) as being free space.

In some instances, the perception engine 106 may receive sensor data from sensor(s) 126 of the autonomous vehicle 102, determine perception data from the sensor data, including occupancy map 124, and transmit the perception data to the planner 108 for use by the planner 108 to determine the path 122, determine one or more trajectories based at least in part on the path 122, control motion of the autonomous vehicle 102 to traverse the path or route (e.g., by transmitting one or more trajectories to control components of the autonomous vehicle 102), and/or otherwise control operation of the autonomous vehicle 102, though any such operation may be performed in various other components.

In some instances, the planner 108 may use perception data, including the occupancy map 124 and/or a current position of the autonomous vehicle 102, and/or the route 110 and/or path 122 to generate instructions for controlling operation of the autonomous vehicle 102. For example, the planner 108 may determine a route for the autonomous vehicle 102 from a start position to an end position; determine an occupancy map based at least in part on sensor data; determine a path, based at least in part on the occupancy map 124, route 110, a cost plot, and/or one or more motion primitives, as discussed further herein; and generate, substantially simultaneously, a plurality of potential trajectories for controlling motion of the autonomous vehicle 102 in accordance with a receding horizon technique (e.g., 1 microsecond, half a second, multiple seconds, etc.) and based at least in part on the path 122; and/or selecting one of the potential trajectories as a trajectory of the autonomous vehicle 102 that may be used to generate a drive control signal that may be transmitted to drive components of the autonomous vehicle 102 to control the autonomous vehicle 102 to traverse the path 122.

Example Operations

FIGS. 2-5 illustrate pictorial flow diagrams of miscellaneous processes related to generating a path based at least in part on a route and an occupancy map. The processes may be used in combination, separately, and/or performed by a same device or different devices. For example, a computing device of an autonomous vehicle may accomplish at least some of the operations and/or a remote computing device (e.g., of a distributed computing service, of a teleoperations system) may accomplish at least some of the operations. Hardware and/or software components of a guidance system, such as including the perception engine 106 and/or planner 108, may be configured to accomplish at least part of example process 200, example process 300, example process 400, and/or example process 500. In an additional or alternate example, a remote computing device may accomplish at least part of example process 200, example process 300, example process 400, and/or example process 500. In some examples, at least some of the operations of the processes may be precomputed by an autonomous vehicle and/or other computing device(s), such as a distributed computing system.

Figure 2:
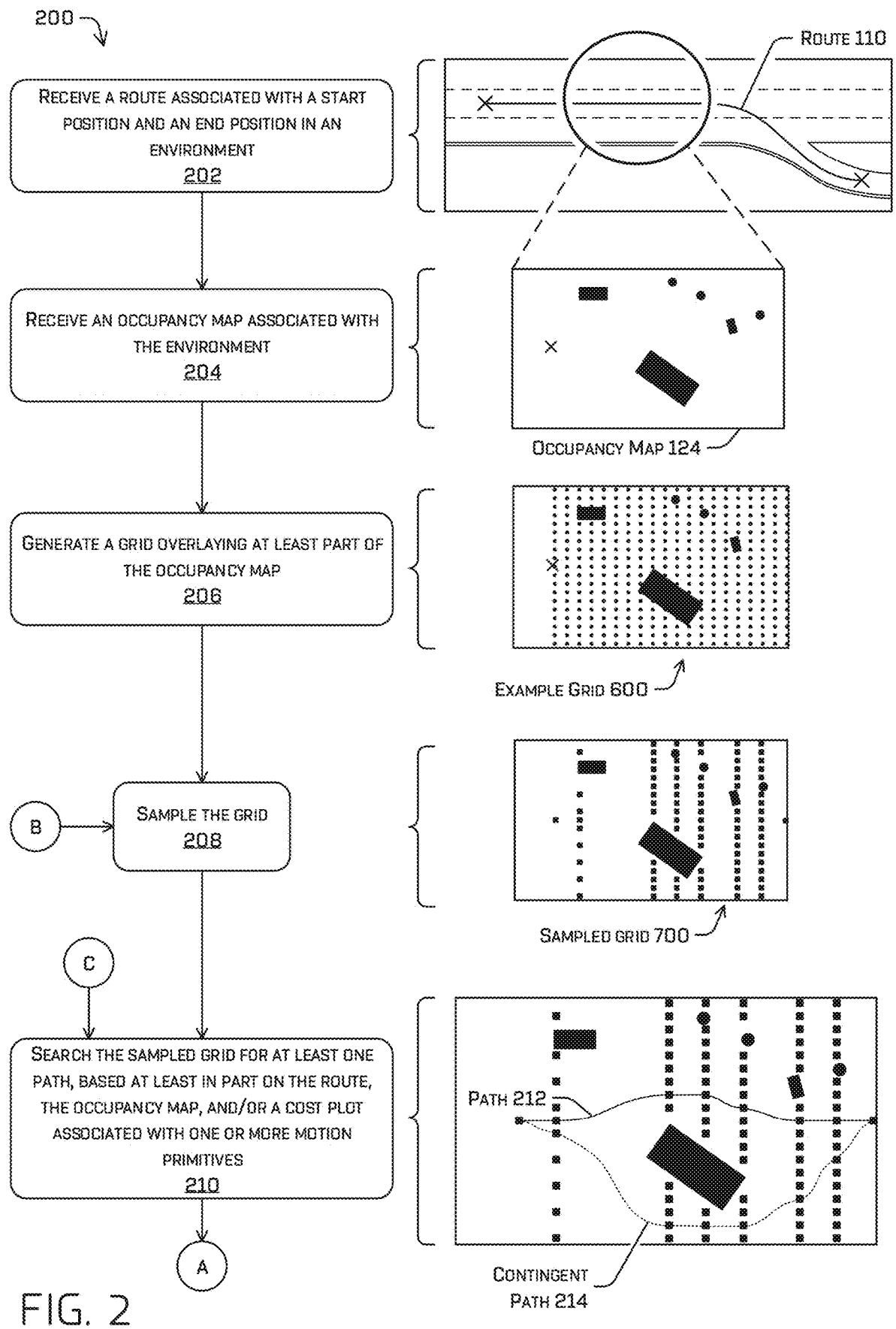
FIG. 2 illustrates a pictorial flow diagram of an example process for generating a path for controlling an autonomous vehicle based at least in part on a data structure which may be generated from sensor data, such as an occupancy map.

FIG. 2 illustrates a pictorial flow diagram of an example process 200 for generating a path based at least in part on a route and an occupancy map.

At operation 202, example process 200 may comprise receiving a route associated with a start position and an end position in an environment, according to any of the techniques discussed herein. In some examples, operation 202 may comprise determining the route based at least in part on a current location of the autonomous vehicle (e.g., determined based at least in part on sensor data) and/or an end position (e.g., a termination point of the route, an intermediate point along the route). The route may additionally or alternatively comprise one or more curve(s) (which may include one or more straight lines), which may be determined based at least in part on curvatures associated with the roadways and/or other ways to the end location. Such curve(s) may correspond with and/or be determined based at least in part on a map stored in a memory and/or indicators associated with a roadway (e.g., determining a shape associated with a median, a double yellow line, a shoulder indication, a sidewalk, and/or the like). In various examples, such routes may additionally or alternatively comprise desired lanes in which to drive, streets to take, and the like.

At operation 204, example process 200 may comprise receiving an occupancy map 124 associated with the environment, according to any of the techniques discussed herein. For example, receiving the occupancy map may comprise detecting one or more objects in the environment based at least in part on sensor data and/or retrieving drivable surface data from memory accessible to the autonomous vehicle. In some examples, a size associated with a detected object may be dilated in one or more directions (e.g., longitudinally and/or laterally) to reduce risk of a collision or near-miss. For example, the size may be dilated by half of the autonomous vehicle's width, a quarter of the autonomous vehicle's width, and/or the like. In some instances, operation 202 may additionally or alternatively comprise determining a distance map wherein a location in the distance map indicates the distance from the location to the nearest location indicated in the occupancy map as being occupied. In some examples, determining a cost associated with a collision may be based at least in part on the distance map.

At operation 206, example process 200 may comprise generating a grid overlaying at least part of the occupancy map, according to any of the techniques discussed herein. In some examples, the grid may comprise a lattice of one or more layers, wherein the grid comprises a number of cells which covers a region in front of the vehicle. A layer may comprise one or more nodes, which may be organized according to a structure (e.g., a line, a vector specifying a shape and/or density). The number of nodes in a layer may be predefined based at least in part on a density (e.g., m nodes per meter of a layer), which may correspond to a maximum target accuracy of the path generated by the guidance system (e.g., the maximum particularity with which the path could be specified). In some examples, the layers of the grid may be spaced along the route according to a predefined density (e.g., p layers per meter of the route) and/or the structure of a layer may lie orthogonally to the route. In some examples, a density of the layers (spaced longitudinally to the route) may differ than a density of the nodes of the layers (spaced laterally to the route). In an additional or alternate example, the nodes may be irregularly spaced (e.g., according to a random generation of node locations) in addition to or instead of being regularly spaced, as described above.

Figure 6A:
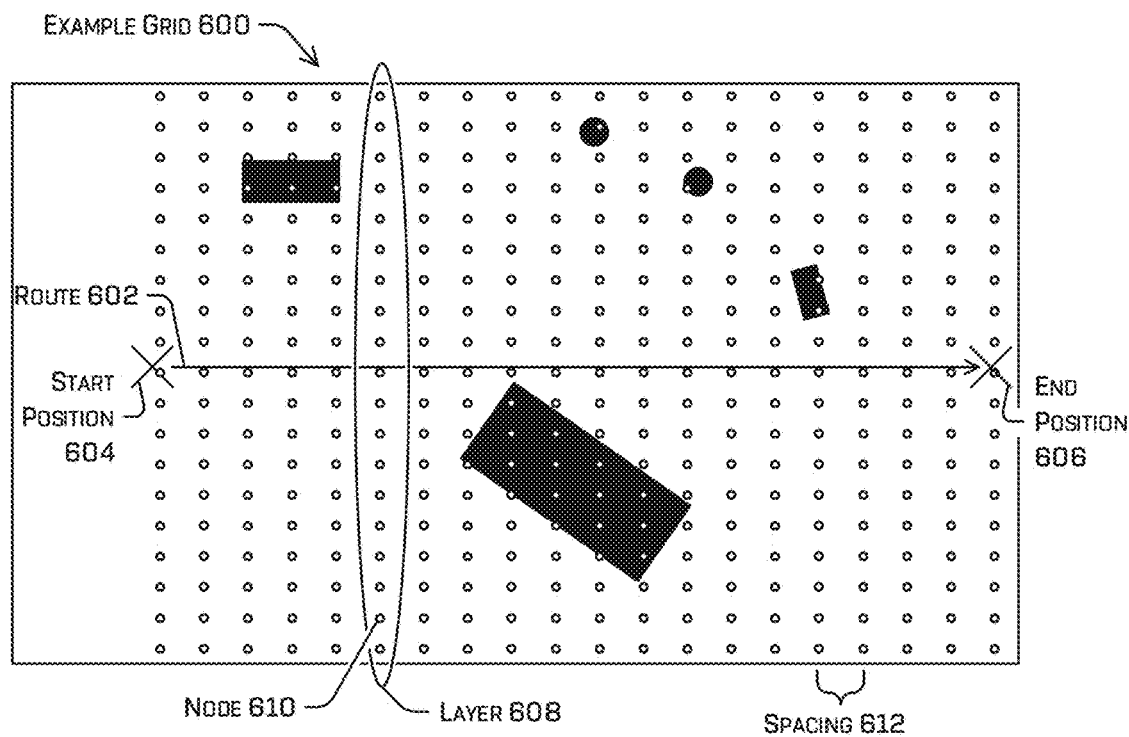
FIG. 6A depicts an example grid comprising layers spaced longitudinally along a first route and comprising multiple nodes.
Figure 6B:
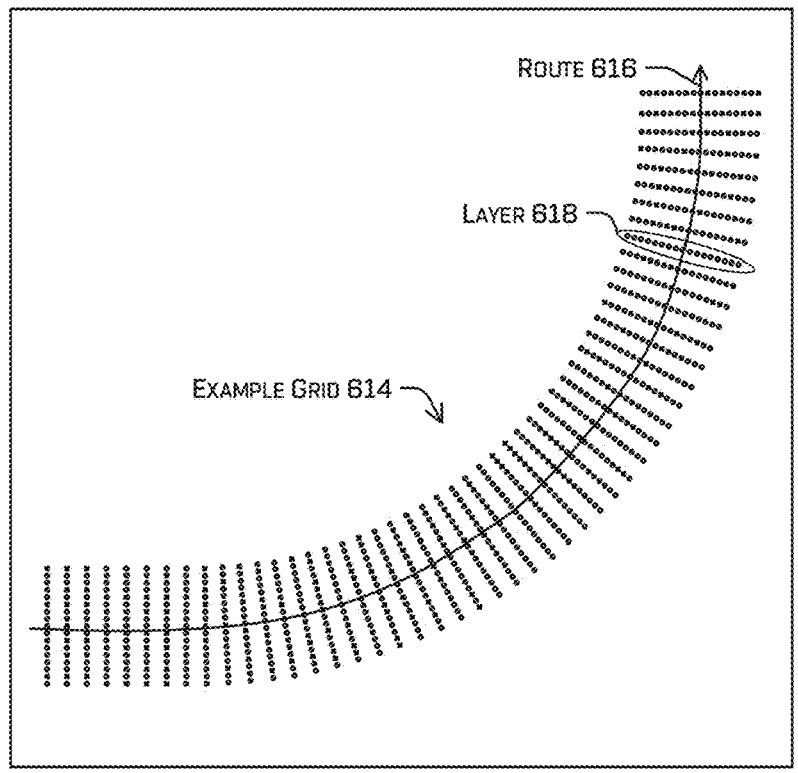
FIG. 6B depicts an example grid comprising layers spaced longitudinally along a second route and comprising multiple nodes.

FIG. 2 includes a depiction of an example grid 600 from FIG. 6A that may be generated based at least in part on a route 602, associated with a start position 604 and/or an end position 606, and overlaid over or otherwise associated with occupancy map 124 (e.g., dimensions of the example grid 600 may correspond with dimensions and/or boundaries of the occupancy map 124). Such a grid may be determined based at least in part on a route-relative coordinate system (e.g., that layers are spaced along a direction of travel and extend in a direction normal thereto). Turning briefly to FIG. 6B, example grid 600 may comprise one or more layers, such as layer 608. A layer, such as layer 608, may comprise a plurality of nodes. Nodes are depicted as small circles in the figures, such as node 610 of layer 608; however, it is understood that the nodes discussed herein may be a vertex of a grid and/or a portion of the grid, such as an area identified by a cell. Regardless, FIG. 6A depicts an example grid 600 comprising layers that may be longitudinally spaced along the route 602 according to a spacing 612 which may be associated with a first predefined density and/or number of layers. Moreover, the number of nodes in a layer may be based at least in part on a second predefined density (e.g., number of nodes within a distance along the layer, which may be lateral to the route in some examples). In some examples, the first density associated with the layers and/or the second density associated with the nodes of a layer may be determined based at least in part on a velocity of the autonomous vehicle and/or an upper bound on the accuracy/granularity of the path, which may be predefined in some examples. The layers of example grid 600 comprise nodes that are distributed laterally/orthogonally to the route 602.

FIG. 6B depicts an example grid 614 that may be generated based at least in part on a route 616. FIG. 6B may more illustrate that the layers of the example grid 600 may be generated such that the layers are spaced along the route 616 and a layer 618 may comprise nodes that are disposed laterally/orthogonally to the route 616. It is understood that the layers and/or nodes may be otherwise generated (e.g., randomly distributed within boundaries that are based at least in part on the route 602 and/or a map).

Returning to FIG. 2, in some examples, the grid may be generated based at least in part on a route frame of reference (e.g., a space defined by the route), where a node of the grid may be associated with a longitudinal, lateral, and/or angular displacement from the route. In additional or alternate examples, the grid may be generated based at least in part on an inertial frame of reference, which may comprise a longitudinal, lateral, and/or angular component with reference to the autonomous vehicle at rest and/or a pose frame of reference, which may comprise a longitudinal, lateral, and/or angular displacement relative to a given inertial pose. The grid may be defined by Euclidean coordinates, Euler angles, spherical coordinates, some combination thereof, and/or the like. In at least one example, such as path-finding for a route, a grid generated using a route frame of reference may be defined based at least in part on a longitudinal displacement along the route, s, a lateral displacement from the route, $e_y$, and/or a heading displacement from an angle associated with the route, $e_\theta$. In an additional or alternate example, such as for path-finding while parking, the grid may comprise a Euclidean space.

At operation 208, example process 200 may comprise sampling the grid, according to any of the techniques discussed herein. For example, sampling the grid may comprise selecting a subset of the layers of the grid ("longitudinal sampling"), selecting one or more nodes of a layer ("lateral sampling"), and/or excluding nodes of a layer that overlap and/or lie within a threshold distance of a portion of the occupancy map identified as being occupied. Selecting a subset of the layers may be based at least in part on a first sample rate (e.g., a minimum, maximum, and/or exact number of layers to select per meter), which may be based at least in part on a velocity of the autonomous vehicle (determined based at least in part on sensor data); a minimum number of layers to select, which may be based at least in part a (maximum) length of the one or more motion primitives discussed herein; and/or the occupancy map 124.

Figure 7:
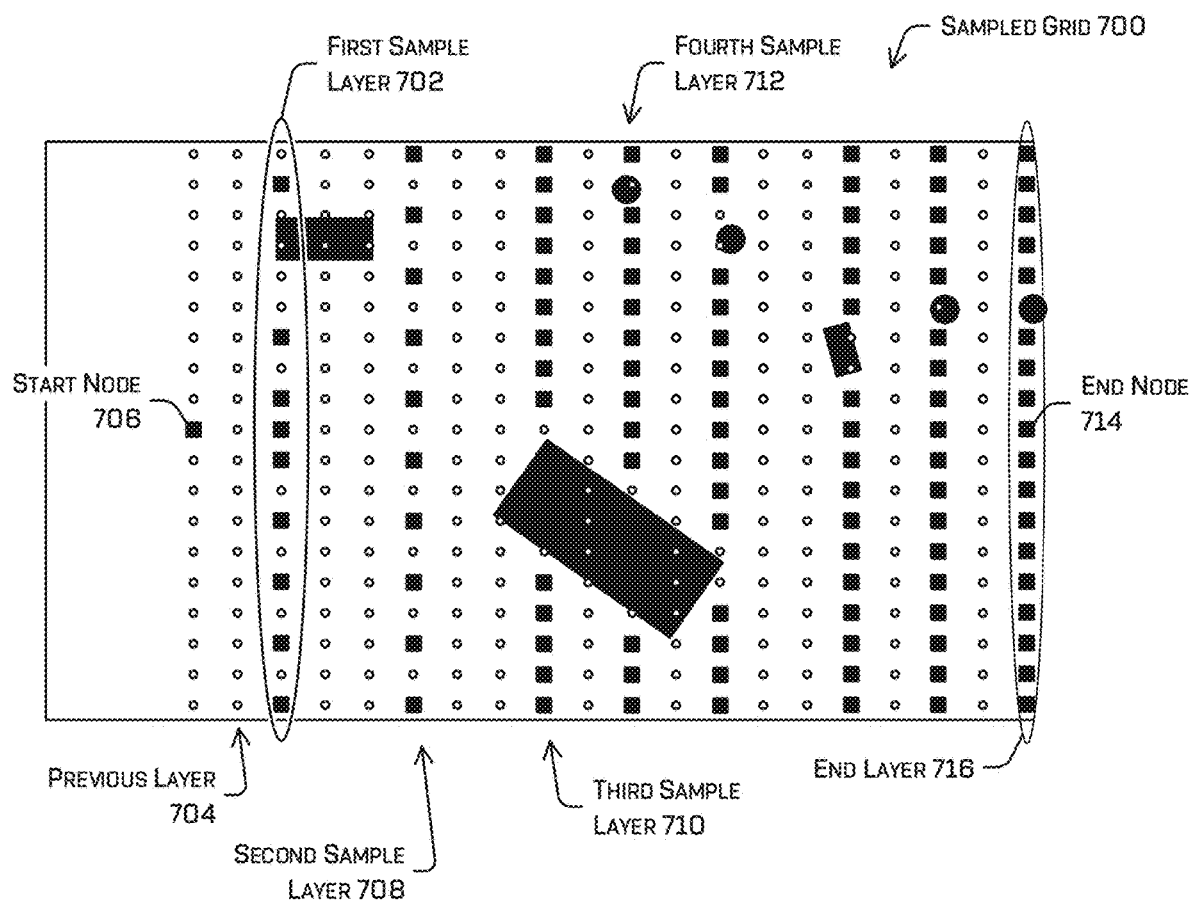
FIG. 7 depicts an example sampled grid that comprises longitudinally sampled layers and/or laterally sampled nodes of example grid 600.

In at least one example, selecting the subset may be dynamic based at least in part on the occupancy map 124, in addition to or instead of a static selection based on the first sample rate (e.g., selecting every o-th layer, where o is a positive integer). In some examples, sampling the example grid 600 may comprise longitudinal sampling (e.g., selecting one or more layers of the example grid) and/or lateral sampling (e.g., selecting one or more nodes of a layer). The sampled grid 700, depicted in greater detail in FIG. 7, includes examples of a dynamically selected subset of layers (a subset of layers selected based at least in part on longitudinal sampling), based at least in part on the occupancy map 124 and the example grid 600. Nodes of the example grid 600 are depicted as circles and nodes of the sampled grid 700, comprising the layers and/or nodes that are selected as samples, are depicted using filled-in squares.

In some examples, dynamic selection of a first sample layer 702 layer (indicated by an ellipse in FIG. 7) of the example grid 600 for inclusion in the subset of layers may comprise determining a first topology of the occupancy map associated with the first sample layer 702. For example, turning to FIG. 7, this may comprise determining a distribution of values of a portion of the occupancy map 124 associated with the first sample layer 702. For example, the portion of the occupancy map 124 associated with the first sample layer 702 may be an (unillustrated) line intersecting the nodes of the first sample layer 702 and associated with the occupancy map 124 and/or an area of the occupancy map 124 that is otherwise associated with the first sample layer 702. In the depicted example, these values may include occupied spaced associated with object detection 128 and may otherwise indicate free space.

Dynamic selection of the first sample layer 702 may additionally or alternatively comprise determining a second topology associated with a previous layer 704 of the example grid 600. For clarity, no ellipse indicates the nodes of the previous layer 704 in FIG. 7, but the previous layer 704 may comprise the group of nodes immediately to the left of nodes of the first sample layer 702 (towards the start node 706). In the depicted example, a second topology associated with the previous layer 704 only indicates free space (i.e., no object detections are associated with the portion of the occupation map 124 associated with the previous layer 704). In some examples, the first sample layer 702 map be selected as a sample for inclusion in the subset of layers, based at least in part on determining that a difference between the first topology and the second topology meets or exceeds a difference threshold. Based at least in part on this rule, the following two layers of the example grid 600 to the right of the first sample layer 702 may not be selected for inclusion in the subset since the topologies of the occupation map 124 associated with those layers do not change in comparison to the first topology; however, the second sample layer 708 may be selected since a third topology associated with the second sample layer 708 may meet or exceed the threshold difference compared to the topologies associated with the layers of the example grid 600 to the right of the first sample layer 702 and left of the second sample layer 708. In other words, the next layer selected for inclusion is a subsequent layer in which the overlap with the occupancy map 124 differs by more than a threshold amount from the previously selected layer to retain or a previous layer in the example grid 600.

The third sample layer 710 and fourth sample layer 712 may demonstrate dynamic selection in combination with a static sample rate. For example, a sample rate may additionally or alternatively define a minimum and/or maximum spacing between layers. The third sample layer 710 may be selected based at least in part on a change in topology and, even though the layer in between the third sample layer 710 and the fourth sample layer 712 may be associated with a change in topology that meets or exceeds the change threshold. For example, selecting a layer according to such a technique may include selecting layer(s) associated with changes in the shape of free space identified by the occupancy map due to the existence of one or more objects (e.g., the free space associated with a particular layer has changed topologically compared to the free space associated with a last selected layer, the two layers have a different number of collision-free intervals, a first collision-free interval of the last selected layer has a different length as a second collision-free interval associated with the particular layer). In some examples, the sample rate may be based at least in part on at least one of an iteration count, a number of previous paths determined to be associated with total costs that meet or exceed a cost threshold, or a density of nodes per distance in the environment.

In some examples, selecting a first layer as a sample layer may additionally or alternatively comprise selecting the first layer based at least in part on determining that the first layer is associated with a different number of free space intervals (e.g., a contiguous portion of the occupation map identified as being unoccupied) than a second layer and/or a first free space interval associated with a first layer is a different length than a second free space interval associated with a second layer. Sampling the layers may be termed "longitudinal sampling."

In some examples, sampling the grid may additionally or alternatively comprise selecting one or more nodes of a layer as sample nodes ("lateral sampling"). For example, nodes of first sample layer 702 and second sample layer 708 have been sampled based at least in part on a second sampling rate, whereas the nodes of the third sample layer 710 and fourth sample layer 712 only been sampled to remove nodes corresponding to occupied space indicated by the occupancy map in the sampled grid 700. In some examples, the nodes selected from a layer may be based at least in part on a second sample rate that specifies a minimum and/or maximum spacing between sample nodes, a density of nodes, a density of nodes in between object detections, and/or the like. In some examples, the sampling nodes of a layer may be dynamic based at least in part on the occupancy map 124, the start node 706 (e.g., a node that is closest to the start position 604, a node that is near the start position 604), the end node 714 (e.g., a node that is closest to the start position 604, a node that is near the start position 604), and/or end layer 716. For example, the sampling may include excluding, from the sampled grid 700, any node that corresponds to occupied space (or within a threshold distance thereof) and/or would result in a collision if the autonomous vehicle were positioned at the node and/or including one or more nodes within a distance threshold of start node 706, end node 714, and/or end layer 716. In some examples, a minimum number of sample nodes may be selected in association with a free space interval.

At operation 210, example process 200 may comprise searching the sampled grid (or the un-sampled grid in an instance where operation 208 is skipped) for at least one path 212 based at least in part on the route, the occupancy map, and/or a cost plot associated with a set of motion primitives, according to any of the techniques discussed herein. As discussed further in regard to FIG. 3 the set of motion primitives and/or the cost plot may be precomputed (e.g., computed and stored in a memory accessible to the autonomous vehicle for retrieval at run-time). In some examples, searching the sampled grid may comprise determining a (contiguous) set of connections between at least a subset of the sample nodes of the sampled grid. Determining connections between a set of the sample nodes may comprise determining a connection between a first node and a second node based at least in part on determining, based at least in part on the set of motion primitives, one or more nodes of the sampled graph to which the first node may be connected. In some examples, the one or more nodes may be stored in a directed graph.

In some examples, the search may comprise an algorithm such as, for example D*, D*lite, Focused Dynamic A*, A*, LPA*, Dijkstra's algorithm, and/or the like, although other search algorithms for searching and/or generating a directed graph and/or a weighted directed graph may be used. In some examples, the search may be based at least in part on constructing a directed graph based at least in part on the sample nodes and a ruleset. For example, the ruleset may specify that no two nodes of a same layer may be connected and/or minimum and/or maximum distance between connected nodes (e.g., the distance may be based at least in part on a maximum length of the set of motion primitives) and/or the like.

In some examples, the example process 200 may additionally or alternatively selecting a search algorithm to use for the search. For example, selecting the search algorithm may comprise selecting the search algorithm from among a plurality of algorithms based at least in part on a velocity of the autonomous vehicle, a compute time and/or compute bandwidth dedicated to the search, and/or a scenario detected by the perception engine and/or dictated by the route (e.g., the autonomous vehicle is finding a path for parking, the autonomous vehicle is finding a path for operating in a city, the autonomous vehicle is finding a path for operating on a highway).

Figure 8A:
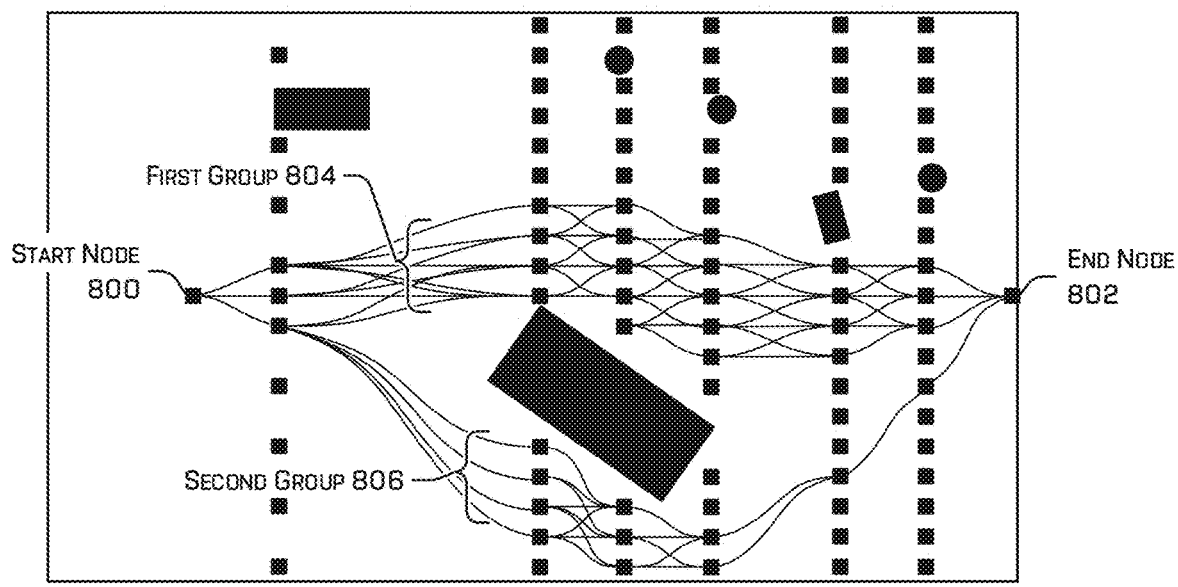
FIG. 8A illustrates an example of multiple paths generated by the search, which may comprise a first group and a second group identified by the search.
Figure 8B:
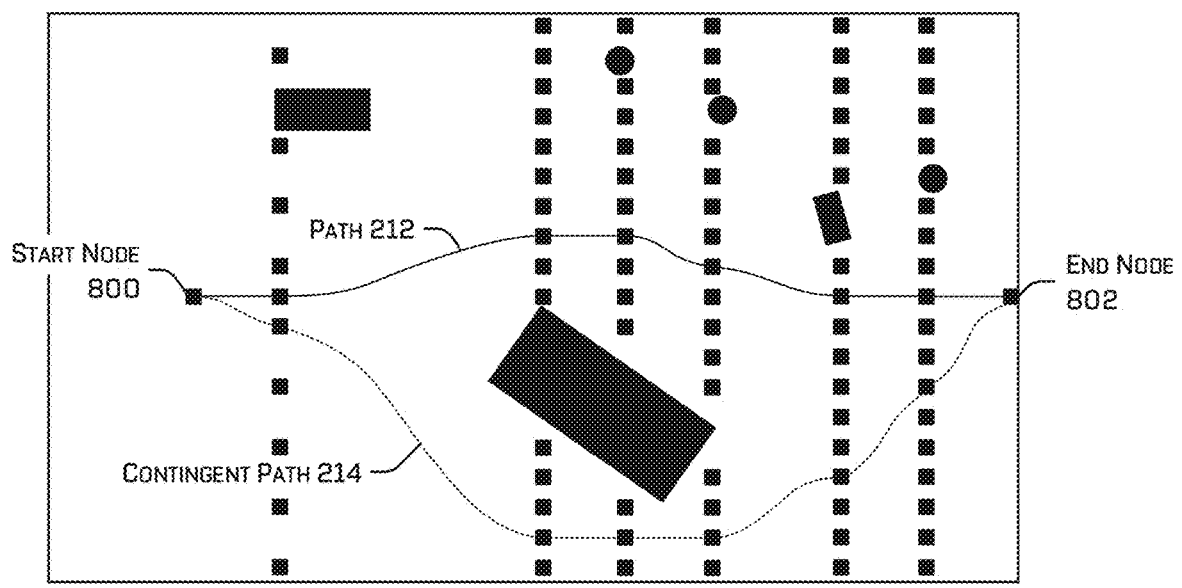
FIG. 8B illustrates an example of a primary path selected from a first group of paths and a contingent path selected from a second group of paths.

The search may start the search from the end position and/or end layer and search for a path to the start position or the search may start from the start position and search for a path to the end position and/or end layer. Regardless, the search may comprise iteratively identifying a node that is as-of-yet unconnected (e.g., based at least in part on determining that the node is collision-free, connectable to a last node that was added to the path by the search (which may be a start node or end node if the search has just begun), and/or associated with a first cost in the cost plot, where the first cost may be less than a threshold cost and/or a minimum cost compared to the other nodes of the next layer), identifying a collision-free motion primitive associated with the node, and adding the node and motion primitive to the path if the motion primitive is collision-free and/or associated with a second cost that is less than a cost threshold. Once a contiguous set of such connections are identified the contiguous set may be output as a path 212. In some examples, the search may determine multiple paths and select the path 212 from among the multiple paths based at least in part on the path 212 having shortest total length and/or a minimum total cost compared to the other paths. For example, FIG. 8A depicts an example of multiple paths generated through the sampled grid between a start node 800 and an end node 802 and FIG. 8B depicts path 212 selected from among the multiple paths. In an additional or alternate example, the search may be configured to guarantee that the search has found a cheapest and/or shortest path, if one exists.

In an additional or alternate example, the search may determine whether multiple homotopic groups exist among multiple paths generated by the search. For example, this may comprise a clustering algorithm, which may be machine learned in some examples; determining a distance between the paths and determining whether the distance is less than a threshold (same group) or whether the distance meets or exceeds the distance threshold (different group). Regardless of how the groups are identified, the search may select a primary path from a first group and p contingent paths from the remaining q number of groups, where p and q are positive integers and p≤q. In some examples, the search may select a path from p+1 or q+1 groups and select one path from each of the groups based at least in part on determining a total cost associated with each of the paths.

For example, the path selected for a group may be associated with a total cost that is a minimum total cost compared to the other paths of the group. The search may select, from among the multiple paths selected from the groups, a primary path based at least in part on a total cost associated with the primary path being a minimum total cost compared to the total costs associated with the multiple paths. For example, path 212 may have been selected from a first group 804 and contingent path 214 may have been selected from a second group 806. Path 212 may have been selected as the primary path based at least in part on a first total cost associated with path 212 and a second total cost associated with contingent path 214.

The search may comprise determining to create a connection between a first sample node of a first layer and a second sample node of a second layer.

Figure 3:
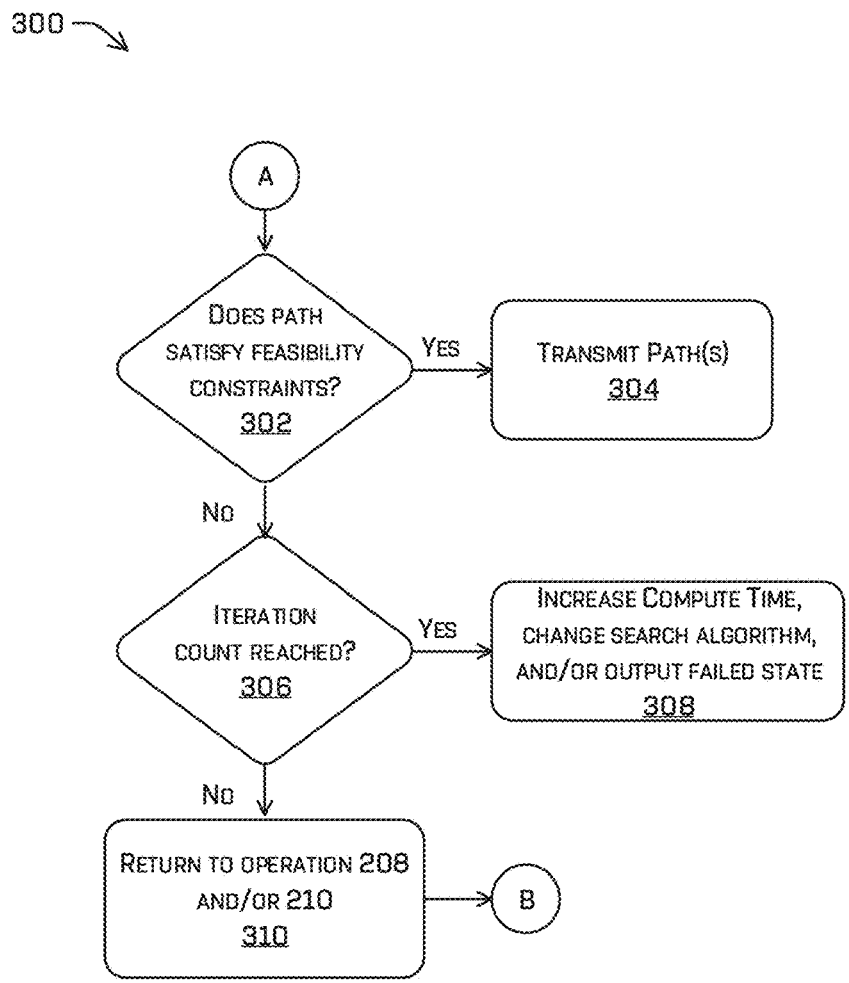
FIG. 3 illustrates a pictorial flow diagram of an example process for an additional or alternative part of generating a path, which may comprise determining whether or not a path generated by a search is feasible and what to do if the path is/isn't feasible.

FIG. 3 depicts a flow diagram of an additional or alternative portion of example process 200, example process 300, which may comprise determining whether or not a path generated by the search is feasible and what to do if the path is/isn't feasible.

At operation 302, example process 300 may comprise determining whether a path generated by the search satisfies a set of feasibility constraints, according to any of the techniques discussed herein. This determination of whether the path is/isn't feasible may include verifying that the path forms a contiguous set of paths from a start position to an end position and/or end layer, verifying and/or determining that the path is collision-free, determining a total cost associated with the path, and/or determining if the total cost is less than a cost threshold.

If the path is feasible, the example process 300 may transition to operation 304, which may comprise transmitting the path. Transmitting the path may comprise outputting the path by one component of the planner for use by another component of the planner, e.g., a trajectory generation component that may determine a trajectory comprising instructions for a drive component to track the path.

If the path is not feasible, e.g., the path is associated with a total cost that meets or exceeds the cost threshold, the path is not collision-free, the path meets or exceeds a threshold length and/or threshold distance from a target route, and/or the like, the example process 300 may transition to operation 306, which may comprise determining an iteration count. For example, after generating the path, the search may increment a counter and determine whether the counter indicates that a predetermined count number has been reached or not (e.g., whether a value indicated by the counter indicates a predetermined number).

If the iteration count has been reached, the example process 300 may transition to operation 308, which may comprise increasing a compute time and/or compute bandwidth allocated to the search, changing the search algorithm used (e.g., switching from D* Lite to A*), and/or computing at least some of the data discussed herein as being precomputed on-vehicle instead, e.g., a motion primitive. Additionally or alternatively, at operation 308, example process 300 may comprise outputting a failed state.

If the iteration count has not been reached, the example process 300 may transition to operation 310, which may comprise returning to operation 208 and/or operation 210. For example, operation 310 may comprise re-sampling the grid to generate a second sampled grid. The re-sampling may comprise a longitudinal sampling and/or a lateral sampling that increases the resolution (number of nodes) of the second sampled grid compared to the former sample grid. Increasing the resolution based at least in part on longitudinal sampling (e.g., selection of layer(s) of the grid) may comprise increasing a sensitivity associated with the longitudinal sampling, for example, by decreasing the change threshold associated with dynamic longitudinal sampling based at least in part on the occupancy map and/or increasing a first sampling rate associated with longitudinal sampling. Additionally or alternatively, increasing the resolution may comprise increasing a second sampling rate associated with lateral sampling (e.g., selection of nodes of layer(s)). After re-sampling, the search at operation 210 may be re-conducted (e.g., up to an iteration count associated with the search) based at least in part on the re-sampled grid.

Figure 4:
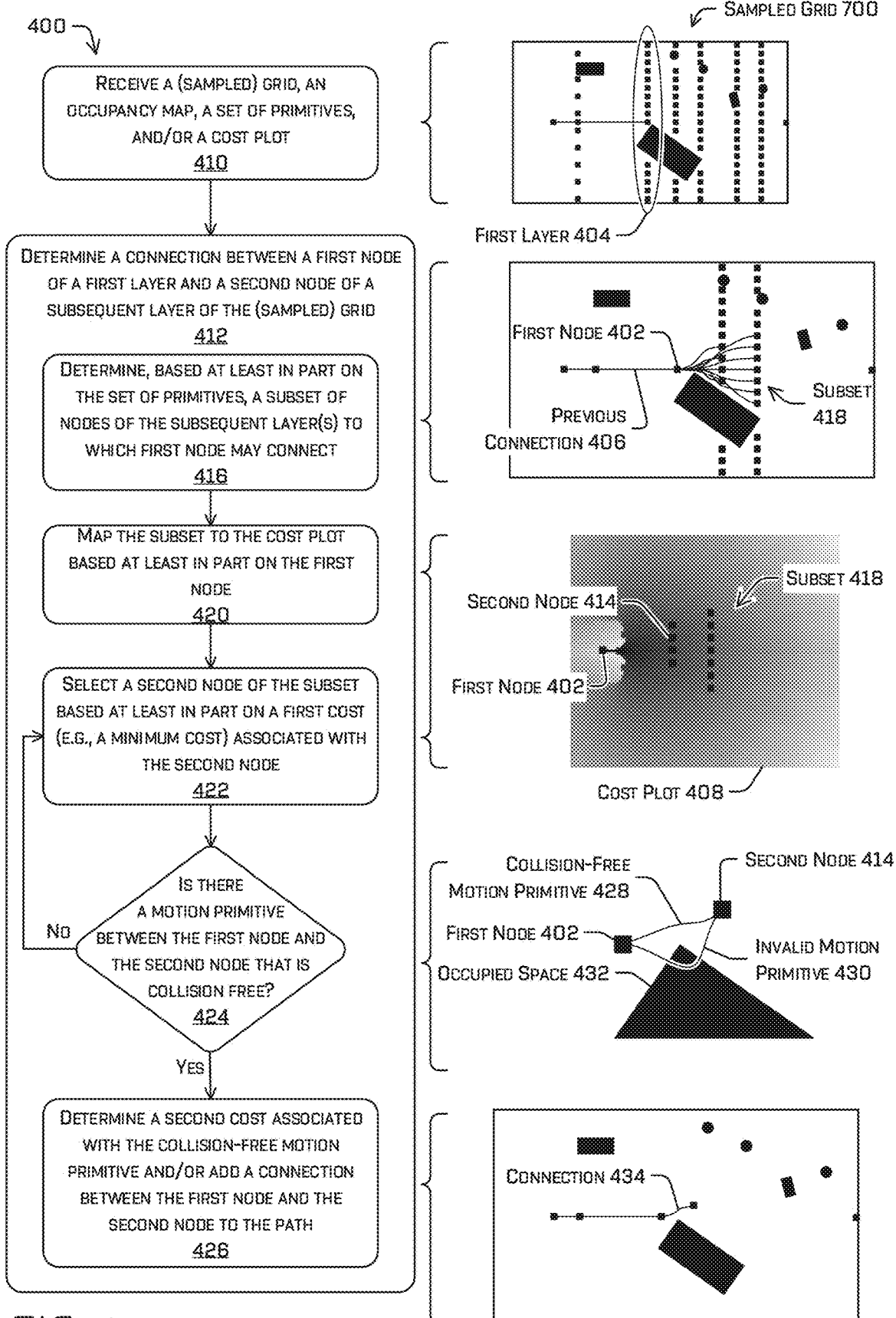
FIG. 4 illustrates a pictorial flow diagram of an example process searching a (sampled) grid for a path between a start node and an end node and/or an end layer, which may comprise determining a connection between a first node of a first layer and a second node of a second layer.

FIG. 4 depicts a flow diagram of an example process 400 of at least a part of the search at operation 210, which may include receiving a first node 402 of a first layer 404. For example, the first node 402 may be a start node, an end node, and/or a node of an end layer, and/or the first node 402 may be a successor node of a previous connection (e.g., a successor/beginning node for the next). In the depicted example, the search starts at a start node associated with the start position and, in searching for a path, two connections have been determined by the path so far. It is understood that in additional or alternate examples, the search may start from the end node and/or another node of the end layer (e.g., the search may be performed in either direction from a starting position to an ending position or the reverse). In some examples, searching from an end node and/or the end layer to the start node may result in finding a path and/or a cheapest path more quickly than searching from the start node to the end node and/or the end layer. The first node 402 in the depicted example is the successor node of a previous connection 406. In searching for a contiguous set of connections, the search may determine which node of one of the succeeding layers (succeeding with reference to the first layer 404) to which to connect the first node 402. In some examples, the search may limit a number of succeeding layers to search based at least in part on a distance associated with the motion primitives, where "succeeding layer(s)" may be defined as the next furthest (sample) layer(s) from the start layer of the search (which may be different than layer associated with the start node, since the search may originate at the end node and/or end layer). For example, the search may limit the search to a next two layers as depicted in FIG. 4, although this number may vary based at least in part on a length associated with the motion primitives.

Determining which node of the succeeding layers to which to connect the first node 402 may be based at least in part on the occupancy map 124, the grid 600 or sampled grid 700, a set of motion primitives 900, and/or a cost plot 408, which may represent cost plot 1000A and/or 1000B.

At operation 410, example process 400 may comprise receiving a (sample) grid, an occupancy map, a set of primitives, and/or a cost plot, according to any of the techniques discussed herein. For example, a component of the perception engine may generate the occupancy map and/or the (sampled) grid and the search may retrieve the set of primitives and/or the cost plot from a memory accessible to the autonomous vehicle, in an example where the set of primitives and/or the cost plot are precomputed.

At operation 412, example process 400 may comprise determining a connection between the first node 402 of the first layer 404 and a second node 414 of one of the subsequent layer(s), according to any of the techniques discussed herein. Determining the connection may be based at least in part on the occupancy map, the set of primitives, and/or the cost plot. For example, determining the connection may be based at least in part on operations 416-426, which may comprise determining a first cost (e.g., a "cost to go") associated with the second node 414, determining a motion primitive between the first node 402 and the second node 414 that is associated with a second cost that is less than a cost threshold or less than costs associated with other motion primitives, and/or determining that the motion primitive is collision-free. In some examples, operation 416-426 may be part of and/or include a search algorithm such as, for example, D*, D*lite, Focused Dynamic A*, A*, LPA*, Dijkstra's algorithm, and/or the like. In some examples, operation 416-426 may comprise finding a subset of nodes that are connectable to a first node, selecting a next unexplored node of the subset of nodes based at least in part on a first cost (e.g., a "cost to go") associated with the next unexplored node indicated by the cost plot (e.g., determining that the next unexplored node is an unexplored node having a first cost associated therewith that is lower than first cost(s) associated with other unexplored node(s)), and/or determining a second cost (e.g., a "cost to come") associated with moving to the next unexplored node from the current position and/or orientation of the vehicle (e.g., if exploring in reverse) or to the final desired position and/or orientation if exploring the graph forward. In at least some examples, such a second cost may be a heuristic cost and precomputed. In such examples, the heuristic cost (though precomputed) may be altered based at least in part on a transformation from the position and/or orientation of the selected node as compared with the final (or starting) node.

At operation 416, example process 400 may comprise determining, based at least in part on the set of primitives, a subset 418 of nodes of the succeeding layer(s) to which the first node 402 may connect (node(s) "connectable" to the first node), according to any of the techniques discussed herein. As discussed above the number of succeeding layer(s) to search may be based at least in part on a predetermined number (e.g., 2, 3, 5, 10), a velocity of the autonomous vehicle, and/or a length associated with the set of primitives. In some examples, determining the subset of nodes to which the first node 402 may connect may be based at least in part on positioning a start of a first motion primitive of the set of motion primitives at the first sample node, determining that the first motion primitive terminates at a third sample node when so positioned, and including the third sample node in the subset of nodes. For example, FIG. 4 depicts a subset 418 of nodes to which the first node 402 may connect. The subset 418 of nodes to which the first node 402 are connectible connect to the first node 402 by at least one motion primitives, as indicated in the diagram to the right of operation 416. In some examples, operation 416 may additionally or alternatively comprise determining that there is a collision-free motion primitive connecting the first node 402 to the node(s).

In some examples, operation 416 may additionally or alternatively comprise storing a directed graph and/or adding the subset 418 of nodes the directed graph. The directed graph may indicate directedness of the graph by any suitable method, such as by indicating that the first node 402 is a predecessor to the subset 418 and/or the subset 418 are successor(s) to the first node 402. The directed graph may additionally or alternatively store connection(s) added to a path, such as previous connection 406, an indication of whether a node stored in the directed graph has been unsuccessfully explored (e.g., selected at operation 422, failure at operation 424)/successfully explored (e.g., selected at operation 422, success at operation 424)/unexplored (e.g., not yet/ever selected at operation 422), and/or the like. In some examples, the directed graph may additionally or alternatively store the second cost associated with a connection (e.g., determined at operation 426).

In some examples, determining a total cost associated with a path generated by the search may comprise looking up the second costs associated with individual connections composing the path, where the second costs and/or individual connections (and/or motion primitives associated therewith) may be stored in association with the directed graph.

At operation 420, example process 400 may comprise mapping one or more nodes (e.g., the subset 418 of nodes determined at operation 416) of the succeeding layers (e.g., two layers in the example depicted in FIG. 4) to the cost plot based at least in part on the first node, according to any of the techniques discussed herein. For example, mapping the second node 414 to the cost plot may comprise mapping the second node 414 from a coordinate space in which the second node was generated (e.g., a route frame, a inertial frame) to a space associated with the cost plot (e.g., a pose frame). In some examples, the grid may be generated based at least in part on a route frame of reference and the cost plot may be generated based at least in part on a pose frame of reference. For example, determining a cost associated with the second node 414 may comprise treating a pose associated with the first node 402 as a reference pose (e.g., $x_r$, $y_r$, $\theta_r$) and mapping the second node to the cost plot may comprise transforming a pose associated with the second node (e.g., $x_2$, $y_2$, $\theta_2$) to a space where the pose associated with the first node is the origin. The transformation of the second node from a coordinate space associated with the grid to a coordinate space associated with the cost plot may be represented as follows, in at least one example:

$$T_{x_r,y_r,\theta_r}(x_2,y_2,\theta_2) \rightarrow T_{se2}^{-1}(T_{se2}(x_r,y_r,\theta_r)^{-1} \cdot T_{se2}(x_2,y_2,\theta_2)) \quad (1)$$

where $T_{se2}$ is a special Euclidean group which may represent a pose, $(x, y, \theta)$, as follows:

$$T_{se2}:(x, y, \theta) \rightarrow \begin{bmatrix} \cos(\theta) & -\sin(\theta) & x \\ \sin(\theta) & \cos(\theta) & y \\ 0 & 0 & 1 \end{bmatrix} \quad (2)$$

At operation 422, example process 400 may comprise selecting the second node 414 based at least in part on a first cost (e.g., a "cost to go") associated with the second node 414, according to any of the techniques discussed herein. In some examples, the first cost associated with the second node may be the value indicated by a location in the cost plot associated with mapping the second node to the cost plot, $T_{x_r,y_r,\theta_r}: (x_2, y_2, \theta_2)$ (i.e., the location of the second node in a pose frame of reference defined using the first node as the reference pose). If the location lies outside the cost plot, the search may determine a projection of the second node outside a boundary of the cost plot and/or a projected cost associated therewith. In some examples, selecting second node 414 based at least in part on the first cost may be based at least in part on determining that the first cost that is less than a cost threshold and/or is less than costs associated with the other nodes of the second layer (e.g., the first cost may be a minimum cost, the first cost may be less than a cost of at least another node of the subsequent layer(s)).

At operation 424, example process 400 may comprise determining whether there is a motion primitive of the set of motion primitives that is collision-free and connects the first node to the second node, according to any of the techniques discussed herein. If no such motion primitive is found, the search may return to operation 422, e.g., until an iteration count is reached and/or until each node of the subset 418 has been explored (e.g., selected at operation 422), in which case the example process 400 may transition to operation 310 and/or the example process 400 may comprise back-tracking, which may comprise removing the previous connection 406 and determining a new previous connection and attempting to determine a new next connection.

Determining whether a motion primitive is collision-free may comprise determining the safety margin cost discussed below in regard to expression (3)—a safety margin cost above a threshold safety margin cost may indicate a collision, in some examples. In an additional or alternate example, determining whether a motion primitive is collision-free may comprise determining a shape that has an arc-length equal to an arc-length of the motion primitive and a width that corresponds to a width of the autonomous vehicle (e.g., the width may equal the width of the autonomous vehicle, the width may be 150% of the width of the autonomous vehicle) and determining whether any portion of the shape overlaps a portion of the occupancy map indicated as being occupied. FIG. 4 depicts a collision-free motion primitive 428 and an invalid motion primitive 430 that is invalid for being associated with a collision (e.g., because the motion primitive 430 overlaps occupied space 432—note that a motion primitive does not need to overlap occupied space to cause a collision, however).

In some examples, determining whether a motion primitive is associated with a collision may comprise representing the autonomous vehicle as two circles having diameters equal to a width of the autonomous vehicle, where a first circle may be centered at the front axle of the autonomous vehicle and a second circle may be centered at the rear axle of the autonomous vehicle. In some examples, the representation of the autonomous vehicle and/or the occupied space indicated by the occupation map may be dilated to account for error (e.g., the diameter of the circle(s) and/or an area indicated as occupied in the occupation may be dilated by half the autonomous vehicle width).

Figure 9A:
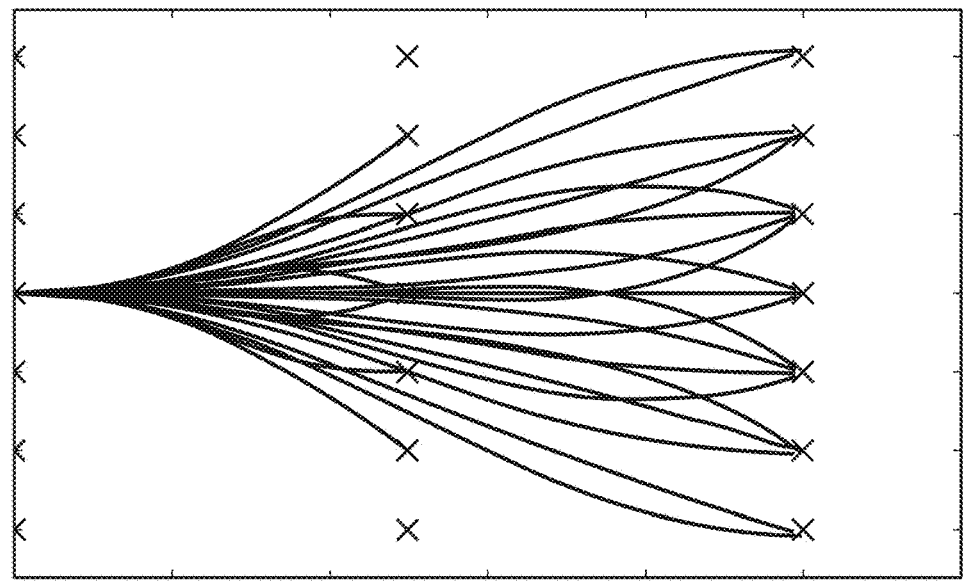
FIG. 9A illustrates an example set of motion primitives.
Figure 9B:
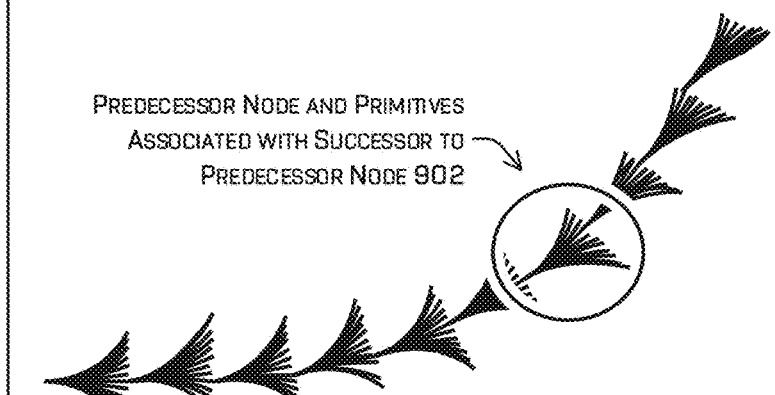
FIG. 9B illustrates an example directed graph and/or indication of successor nodes and respective motion primitives of predecessors selected by the search.

Determining whether a motion primitive connects the first node to the second node may comprise transforming the set of motion primitives into an inertial frame and/or route frame associated with the first node (e.g., an inversion of expression (1) above) and determining that the motion primitive starts at the first node and terminates at the second node. Based at least in part on determining that the motion primitive starts at the first node and terminates at the second node, the search may comprise identifying the first node as a predecessor to the second node and the second node as a successor to the first node. In some examples, the search may comprise determining a subset of motion primitives that start at the first node and terminate at the second node. Additionally or alternatively, the search may be based at least in part on a directed graph that comprises such subsets for each sampled node (e.g., an identification of the nodes that are successors to each sampled node and/or a motion primitive that connects the successors to a sampled node). In some examples, such a directed graph may be determined before conducting the search. For example, FIG. 9B depicts an example of a predecessor node and motion primitives associated with succors to the predecessor node of an r-th node in a path (902). FIG. 9B includes such a depiction for each node/connection selected based at least in part on a search.

At operation 426, example process 400 may comprise determining a second cost (e.g., a "cost to come" or "cost to go", depending on the direction of search) associated with the motion primitive determined at operation 422 and/or adding a connection between the first node and the second node to the path based at least in part on the second cost, according to any of the techniques discussed herein. The second cost may be based at least in part on a current pose of the autonomous vehicle and/or a pose associated with the first node; a curvature of the motion primitive; a safety margin cost that is based at least in part on a first distance from at least a portion of the motion primitive to a portion of the occupancy map identified as being occupied (e.g., a distance of the motion primitive between the first node and second node from one or more object(s) indicated by the occupancy map); a first difference between the motion primitive between the first node and the second node and a previous motion primitive associated with a previous connection between a previous node and the first node (e.g., how much the motion primitive deviates from a previous motion primitive); a second distance of at least a portion of the motion primitive from a lane associated with the start position, the end position, and/or a target position; and/or a second difference between a first pose associated with the first node, the second node, and/or the motion primitive and a second pose associated with the end position and/or end layer.

For example, determining the safety margin cost may comprise evaluating the following expression based at least in part connecting the first node to the second node by the motion primitive:

$$\int_0^{s_f} k_0 \max(k_1 - d(s), 0)^2 ds \quad (3)$$

where $k_0$ may comprise a predetermined constant weight, $k_1$ may comprise a safety margin (e.g., a predefined minimum distance from which the autonomous vehicle should operate, and $d(s)$ may comprise a distance to the closest object indicated by the occupancy map at arc-length $s$, and $s_f$ is a final position along the motion primitive. In at least some examples, such distances, $d(s)$, may be computed over the entire region based on the occupancy map such that the determining the cost above may comprise a lookup of the distance map.

Determining the second difference (and cost associated therewith) between a first pose and a second pose associated with the end position and/or end layer may comprise evaluating the following expression:

$$c_0(s - s_{end})^2 + c_1(e_y - e_{y,end})^2 + c_2(e_\theta - e_{\theta,end})^2 \quad (4)$$

where $c_0$, $c_0$, and $c_0$ may be predetermined (e.g., machine-learned) weights, and the expression evaluates a total difference between a longitudinal position associated with the first node, the second node, and/or the motion primitive and a longitudinal position associated with the end position and/or end layer; between a lateral position associated with the first node, the second node, and/or the motion primitive and a lateral position associated with the end position and/or the end layer, and between a yaw associated with the first node, the second node, and/or the motion primitive and a yaw associated with the end position and/or the end layer.

Determining a cost associated with a motion primitive, e.g., associated with a curvature of the motion primitive may comprise evaluating the following expression:

$$a_0 s_f + a_1 \int_0^{s_f} k(s)^2 ds + a_2 \int_0^{s_f} k'(s)^2 ds \quad (5)$$

where $a_0$, $a_1$, and $a_2$ are predetermined weights, $k(s)$ is the curvature of the motion primitive at arc-length $s$, and $a_1 \int_0^{s_f} k(s)^2 ds$ and/or $a_2 \int_0^{s_f} k'(s)^2 ds$ may be precomputed in association with the set of motion primitives.

In some examples, the search may add a connection 434 between the first node 402 and the second node 414 based at least in part on the second cost. For example, the search may add the connection 434 based at least in part on determining that the second cost is less than a cost threshold. In some examples, adding the connection 434 may comprise associating the motion primitive and/or the second cost with the first node 402 and the second node 414 (e.g., by associating connection 434 with the first node 402, the second node 414, the second cost, and/or the collision-free motion primitive 428 in the directed graph). In some examples, the first cost and/or the second cost may be part of the total cost determined by the search in association with the path. In some examples, the example process 400 may additionally or alternatively comprise associating the second cost with the first node 402 and the second node 414 in the directed graph regardless of whether the second cost is less than the cost threshold or not. The directed graph may thereby comprise a record of explored nodes and the second costs associated therewith.

In some examples, one or more operations of example process 400 may be accomplished by parallel computation, e.g., by a graphic processing unit (GPU). For example, operation 416 may additionally or alternatively comprise excluding nodes of the succeeding layers that are outside a boundary associated with the set of motion primitives (e.g., a maximum x, y, and/or θ away from the first node 402) and generating a thread or other parallel process in association with each of the remaining nodes. In similar examples, e.g., in those in which all possible and/or subsets of all possible connections between nodes are determined, such parallel computation may comprise computing all costs associated with all possible paths. The threads/parallel processes may be assigned to different cores and/or pipelines of a processing unit capable of parallel processing (e.g., pipelines of a GPU, multithreads and/or cores of a central processing unit (CPU)) and determining, in parallel at the different respective cores and/or pipelines, whether there is a motion primitive that connects to the first node to each of the remaining nodes. Operations 412 and/or 416-426 may be accomplished in a similar manner. In some examples, multiple searches may be simultaneously conducted in parallel and/or different nodes may be explored in parallel.

Figure 5:
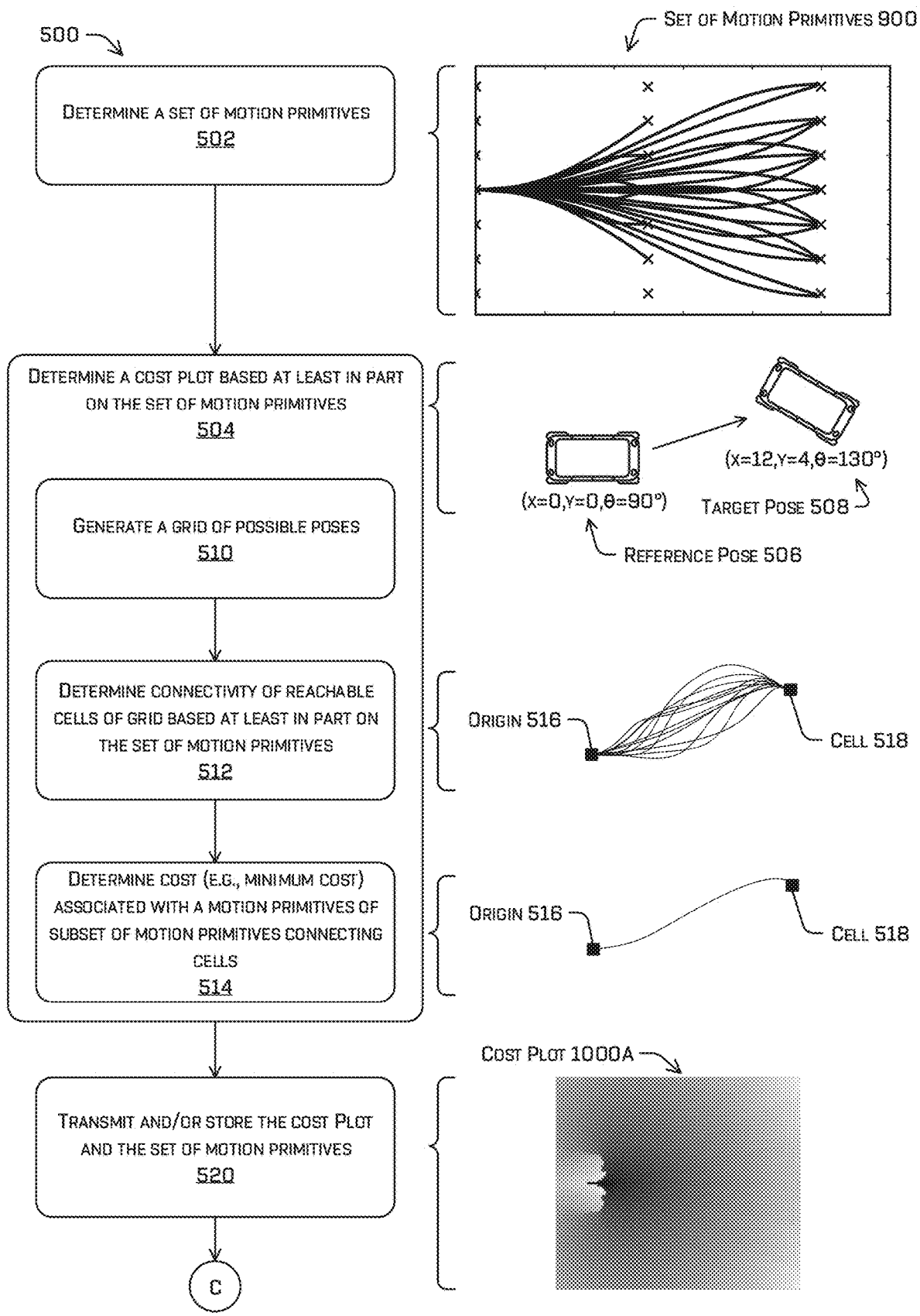
FIG. 5 illustrates a flow diagram of an example process for generating (e.g., precomputing) a set of motion primitives and/or a cost plot.

FIG. 5 illustrates an example process 500 for determining a set of motion primitives and/or a cost plot.

At operation 502, example process 500 may comprise determining a set of motion primitives and/or a costs associated therewith, according to any of the techniques discussed herein. For example, in some instances the set of motion primitives may be precomputed (e.g., conducting the operations discussed herein before run-time) by a remote computing device and/or the autonomous vehicle (e.g., when the autonomous vehicle is idling/not currently accomplishing a mission, when the autonomous vehicle is being evaluated and/or maintained) of a set of motion primitives. In some examples, the set of motion primitives may include an indication of a predecessor/successor node pair. FIG. 9A depicts a set of motion primitives 900. In some examples, the set may comprise hundreds or thousands of motion primitives, but the example depicted in FIG. 9A comprises tens of motion primitives 900 for the sake of clarity. In some examples, a motion primitive may be a representation of a feasible motion of the autonomous vehicle, such as a polynomial line, a cubic spiral, Bezier, clothoid, and/or the like. For example, a motion primitive may be represented as a cubic polynomial having parameters a, b, c, d, and sf as follows for any arc-length, s, in the range of $[0, s_f]$:

$$x(s) = x(0) + \int_0^s \cos(\theta(t))dt \quad (6)$$

$$y(s) = y(0) + \int_0^s \sin(\theta(t))dt \quad (7)$$

$$\theta(s) = \theta(0) + as + \frac{bs^2}{2} + \frac{cs^3}{3} + \frac{ds^4}{4} \quad (8)$$

$$k(s) = a + bs + cs^2 + ds^3 \quad (9)$$

where a, b, c, and d may be represented as follows:

$$\begin{bmatrix} a \\ b \\ c \\ d \end{bmatrix} = \begin{bmatrix} 1 & 0 & 0 & 0 \\ -\frac{5.5}{s_f} & \frac{9}{s_f} & -\frac{4.5}{s_f} & \frac{1}{s_f} \\ \frac{9}{s_f^2} & -\frac{22.5}{s_f^2} & \frac{18}{s_f^2} & -\frac{4.5}{s_f^2} \\ -\frac{4.5}{s_f^3} & \frac{13.5}{s_f^3} & -\frac{13.5}{s_f^3} & \frac{4.5}{s_f^3} \end{bmatrix} \quad (10)$$

where $k_i$ is the curvature of the cubic polynomial at arc-length $\frac{i}{3}s_f$.

Additionally or alternatively, determining the set of motion primitives may comprise determining motion primitives having parameters that connect a first pose and a second pose in an inertial frame of reference. For example, determining the set of motion primitives may determining motion primitives that connect an origin (e.g., a reference pose) to a target pose and iterate through all possible target poses in a bounded space based at least in part on a predetermined resolution and one or more smoothness constraints (e.g., minimum and/or maximum value(s) of the parameters) to ensure that the motion primitives do not cause erratic or uncomfortable steering controls. In some examples, the smoothness constraints may be based at least in part on a velocity range associated with the vehicle. In some examples, multiple sets of motion primitives may be generated for different velocity ranges (e.g., a first set of motion primitives may be generated for a first velocity range, e.g., 80-100 kilometers per hour based at least in part on a first set of smoothness constraints). For example, the smoothness constraints may constrain the parameters more (e.g., reduce in value) as velocity increases, resulting in smoother/straighter motion primitives for higher speeds. The set of motion primitives 900 depicts a set of such motion primitives having a resolution of x=5, y=1, and $$\theta = \frac{\pi}{8}.$$

In an additional or alternate example for generating hundreds or thousands of motion primitives, the resolution may be x=0.2, y=0.2, and θ=0.2.

In some examples, determining the set of motion primitives may comprise solving, e.g., via Newton's method for finding function roots, for parameters associated with a spiral/polynomial/Bezier/etc. that originates at the origin and terminates at a location that is a multiple of the resolution (e.g., multiple(s) of x=0.2, y=0.2, and θ=0.2 up to a bound). Other root-finding methods may be used to solve for the parameters, such as, for example, Halley's method, the Secant method, Steffensen's method, Brent's method, and/or the like.

In some examples, determining the set of motion primitives may be conducted as a parallel computation (e.g., split up among multiple processors/processor cores, such as by using multiple graphics processing unit (GPU) pipelines and/or multiple central processing unit (CPU) cores).

At operation 504, example process 500 may comprise determining a cost plot based at least in part on the set of motion primitives, according to any of the techniques discussed herein. In some examples, the origin of the cost plot may be associated with a reference pose and/or reference inertial state and a location in the cost plot may identify a minimum cost of changing the pose to a pose identified by the location and/or a motion primitive associated with the minimum cost. For example, the cost plot may comprise a minimum cost (and/or a motion primitive associated with the minimum cost) associated with moving from reference pose 506 ($x_r=0$, $y_r=0$, $\theta_r=90°$) to target pose 508 ($x_t=12$, $y_t=4$, $\theta_t=130°$), where the reference pose 506 may be associated with an origin of the cost plot, the target pose 508 may be associated with a location of the cost plot, and a value associated with the location may comprise the minimum cost and/or motion primitive parameters. Determining the cost plot may comprise generating a grid of possible poses based at least in part on a resolution at operation 510, determining connectivity of reachable cells based at least in part on the set of motion primitive at operation 512, and/or determining a cost (e.g., a minimum cost) and/or a motion primitive associated therewith between connected cells at operation 514. In some examples, one or more of operations 510-514 may be part of a Dijkstra or other similar algorithm.

At operation 510, example process 500 may comprise generating a grid of possible poses, according to any of the techniques discussed herein. In some examples, operation 510 may comprise discretizing a special Euclidean space into cells indicating poses.

At operation 512, example process 500 may comprise determining the connectivity of reachable cells based at least in part on the set of motion primitives, according to any of the techniques discussed herein. For example, operation 512 may comprise determining whether at least one motion primitive (a subset) of the set of motion primitives connects the origin 516 of the cost plot to a cell 518 (e.g., when a start of the motion primitive is located at the origin 516 a terminus of the motion primitive contacts the cell 518).

At operation 514, example process 500 may comprise determining a cost associated with each motion primitive of the subset of motion primitives connecting the origin to a cell, according to any of the techniques discussed herein. For example, determining a cost associated with a motion primitive, e.g., associated with a curvature of the motion primitive may comprise evaluating the following expression:

$$a_0 s_f + a_1 \int_0^{s_f} k(s)^2 ds + a_2 \int_0^{s_f} k'(s)^2 ds \quad (5)$$

where $a_0$, $a_1$, and $a_2$ are predetermined weights, $k(s)$ is the curvature of the motion primitive at arc-length s, and $a_1 \int_0^s k(s)^2 ds$ and/or $a_2 \int_0^s k'(s)^{40} ds$. Such a motion cost associated with the primitive may be precomputed and associated with the primitive to enable quick lookups of the cost.

In some examples, operation 514 may comprise determining a minimum cost among the one or more costs associated with the subset and associating the minimum cost with the location of the cell 518. Operation 514 may additionally or alternatively associate parameters of a motion primitive associated with the minimum cost with the cell 518.

Similar operations of those of 504 (whether performed substantially simultaneously, sequentially, or otherwise) may be performed to compute additional costs used. As a non-limiting example, a heuristic (first) cost may be computed for all potential starting positions relative to a desired end position and/or orientation and such costs stored in a cost plot, such as cost plot 1000a.

At operation 520, example process 500 may comprise transmitting and/or storing the cost plot and/or the set of motion primitives, according to any of the techniques discussed herein. For example, a remote computing device may transmit the cost plot (e.g., cost plot 1000A) and/or the set of motion primitives to one or more autonomous vehicles and/or an autonomous vehicle may store the cost plot and/or the set of motion primitives. In some examples, multiple cost plots may be generated in association with different sets of motion primitives (e.g., where multiple sets of motion primitives are generated in association with different ranges of velocity).

Figure 10A:
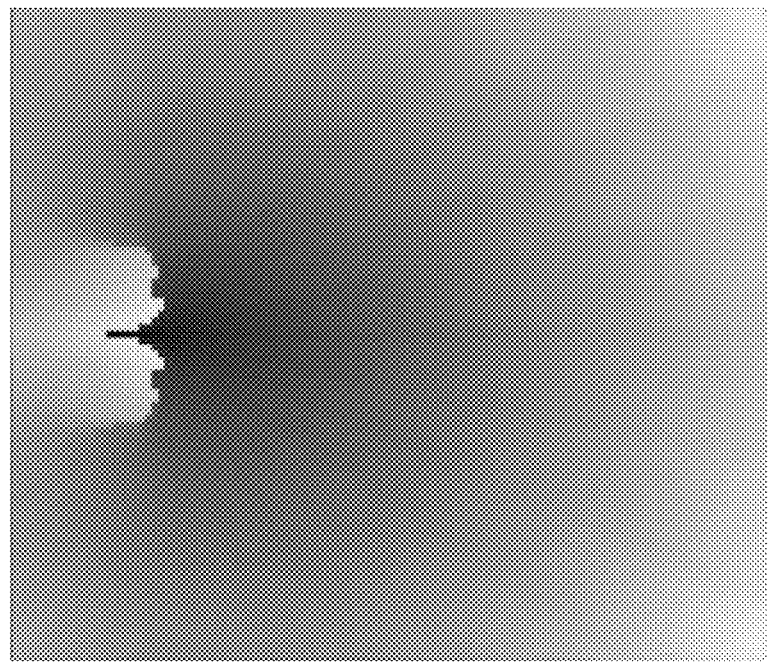
FIGS. 10A and 10B illustrate respective portions of a cost plot.
Figure 10B:
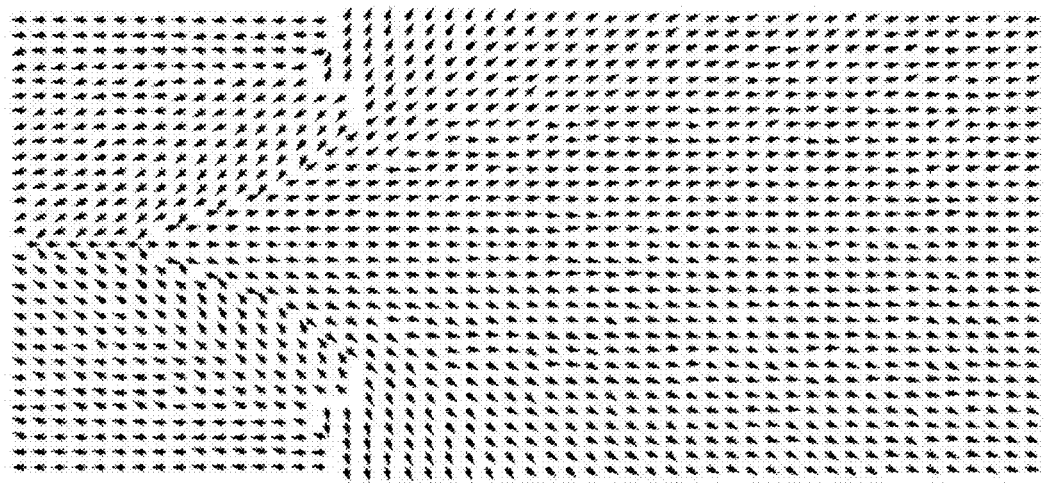

FIGS. 10A and 10B depict respective portions of an example cost plot 1000. Cost plot 1000A depicts cost values (darker shades indicate lower cost, lighter shades indicate higher cost) associated with x and y positions at the yaw positions specified by cost plot 1000B, which may be the minimum cost yaw for each position in the depicted example. In various examples, such a cost plot may be associated with a heuristic cost, as specified above. As further described in detail herein, initial positions which lie outside such a cost plot may be estimated based on interpolations (or extrapolations) of the closest point or point in the cost plot.

Example System

Figure 11:
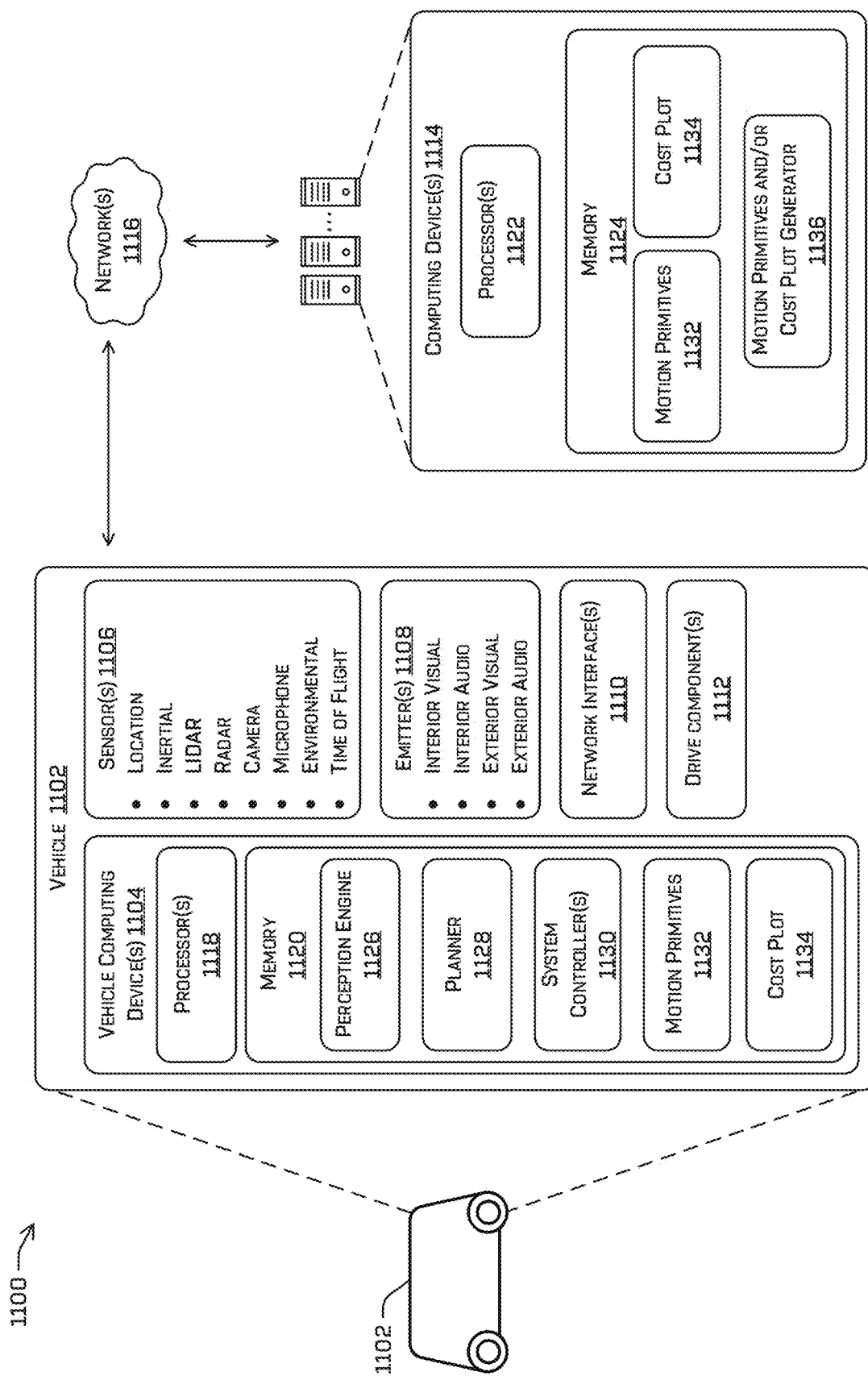
FIG. 11 illustrates a block diagram of an example guidance system and/or a system for precomputing a set of motion primitives and/or a cost plot.

FIG. 11 illustrates a block diagram of an example system that implements the techniques discussed herein. In some instances, the system 1100 may include a vehicle 1102, which may correspond to the autonomous vehicle 102 in FIG. 1. In some instances, the vehicle 1102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 1102 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 1102 may include a vehicle computing device 1104, one or more sensor(s) 1106, one or more emitters 1108, one or more network interfaces 1110, and/or one or more drive components 1112. In some instances, vehicle computing device 1104 may represent computing device(s) 104 and/or sensor(s) 1106 may represent sensor(s) 126.

In some instances, the sensor(s) 1106 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., camera, e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. The sensor(s) 1106 may include multiple instances of each of these or other types of sensors. For instance, the lidar sensors may include individual lidar sensors located at the corners, front, back, sides, and/or top of the vehicle 1102. As another example, the cameras may include multiple cameras disposed at various locations about the exterior and/or interior of the vehicle 1102. The sensor(s) 1106 may provide input to the vehicle computing device 1104.

The vehicle 1102 may also include emitter(s) 1108 for emitting light and/or sound. The emitter(s) 1108 in this example may include interior audio and visual emitter(s) to communicate with passengers of the vehicle 1102. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 1108 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 1102 may also include network interface(s) 1110 that enable communication between the vehicle 1102 and one or more other local or remote computing device(s). For instance, the network interface(s) 1110 may facilitate communication with other local computing device(s) on the vehicle 1102 and/or the drive component(s) 1112. Also, the network interface (s) 1110 may additionally or alternatively allow the vehicle to communicate with other nearby computing device(s) (e.g., other nearby vehicles, traffic signals, etc.). The network interface(s) 1110 may additionally or alternatively enable the vehicle 1102 to communicate with a computing device(s) 1114. In some examples, computing device(s) 1114 may comprise one or more nodes of a distributed computing system (e.g., a cloud computing architecture).

The network interface(s) 1110 may include physical and/or logical interfaces for connecting the vehicle computing device 1104 to another computing device or a network, such as network(s) 1116. For example, the network interface(s) 1110 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 1104 and/or the sensor(s) 1106 may send sensor data, via the network(s) 1116, to the computing device(s) 1114 at a particular frequency, after a lapse of a predetermined period of time, in near real-time, etc.

In some instances, the vehicle 1102 may include one or more drive components 1112. In some instances, the vehicle 1102 may have a single drive component 1112. In some instances, the drive component(s) 1112 may include one or more sensors to detect conditions of the drive component(s) 1112 and/or the surroundings of the vehicle 1102. By way of example and not limitation, the sensor(s) of the drive component(s) 1112 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 1112. In some cases, the sensor(s) on the drive component(s) 1112 may overlap or supplement corresponding systems of the vehicle 1102 (e.g., sensor(s) 1106).

The drive component(s) 1112 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 1112 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 1112. Furthermore, the drive component(s) 1112 may also include one or more communication connection(s) that enable communication by the respective drive component with one or more other local or remote computing device(s).

The vehicle computing device 1104 may include one or more processors, processor(s) 1118, and memory 1120 communicatively coupled with the one or more processors 1118. Computing device(s) 1114 may additionally or alternatively include processor(s) 1122, and/or memory 1124. The processor(s) 1118 and/or 1122 may be any suitable processor capable of executing instructions to process data and perform operations as described herein. By way of example and not limitation, the processor(s) 1118 and/or 1122 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 1120 and/or 1124 may be examples of non-transitory computer-readable media. The memory 1120 and/or 1124 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1120 may store a perception engine 1126, which may represent perception engine 106, and/or a planner 1128, which may represent planner 108, either or both of which may comprise hardware, software, or some combination thereof. Memory 1120 may additionally or alternatively store one or more system controller(s) 1130 (which may additionally or alternatively be implemented as hardware), which may be configured to control steering, propulsion, braking, safety, emitters, communication, and other systems of the vehicle 1102. These system controller(s) 1130 may communicate with and/or control corresponding systems of the drive component(s) 1112 and/or other components of the vehicle 1102. For example, a planner may generate instructions for controlling vehicle 1102 based at least in part on an output of perception engine 1126 and/or planner 1128, such as a path, and transmit the instructions to the system controller(s) 1130, which may control operation of the vehicle 1102 based at least in part on the instructions.

In some instances, the memory 1120 and/or memory 1124 may store a set of motion primitives 1132 and/or cost plot 1134 in association with the set of motion primitives, such as those motion primitives and/or cost plots as described herein. In some examples, memory 1124 may additionally or alternatively store a motion primitives and/or cost plot generator 1136. In some examples, the motion primitives and/or cost plot generator 1136 may comprise a machine-learned (ML) model (e.g., a neural network) and/or a parallel processing component.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BBN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

It should be noted that while FIG. 11 is illustrated as a distributed system, in alternative examples, components of the vehicle 1102 may be associated with the computing device(s) 1114 and/or components of the computing device(s) 1114 may be associated with the vehicle 1102. That is, the vehicle 1102 may perform one or more of the functions associated with the computing device(s) 1114, and vice versa.

Example Clauses

A. A method comprising: receiving a route associated with a start position and an end position in an environment; receiving sensor data from a sensor; determining, based at least in part on the sensor data, a data structure indicating whether space in the environment is occupied or unoccupied; determining, based at least in part on the route, a first grid comprising one or more layers disposed at intervals along the route and defining a plurality of nodes associated with different locations in the environment; determining a subset of nodes based at least in part on the data structure; determining, based at least in part on the subset of nodes, a cost plot, and a set of potential motions, a path between the start position and at least one of the end position or an end layer, the cost plot comprising a set of values indicative of costs to move from a range of positions and orientations to a desired position and orientations; and controlling the autonomous vehicle based at least in part on the path.

B. The method of paragraph A, wherein a potential movement of the set of potential movements is associated with a motion cost, the method further comprising: determining, based at least in part on the second node and the cost plot, a first cost; and determining, based at least in part on the motion cost, a connection between a first node and a second node of the subset of nodes, wherein the path comprises the connection.

C. The method of either paragraph A or B, wherein a potential motion of the set of potential motions is precomputed based at least in part on: generating a second grid comprising a plurality of cells, wherein a first cell of the plurality of cells represents a first pose of the autonomous vehicle and a second cell of the plurality of cells represents a second pose of the autonomous vehicle; and determining a curve which, when followed by the autonomous vehicle from the first cell to the second cell, will cause the autonomous vehicle to align with the second pose.

D. The method of any one of paragraphs A-C, wherein determining the subset of nodes based at least in part on the data structure comprises at least one of: determining, as a sample layer, a first layer of the one or more layers based at least in part on determining that a first number of nodes of the first layer associated with first occupied space of the data structure differs from a second number of nodes of a second layer previous to the first layer associated with second occupied space of the data structure; or determining, as sample nodes, one or more nodes of the first layer based at least in part on a sample rate.

E. The method of any one of paragraphs A-D, wherein: determining the path comprises a search; the search is a first search, the sample layer is a first sample layer of a first set of sample layers, the sample nodes are first sample nodes, and the sample rate is a first sample rate; and the method further comprises: determining that, within a threshold amount of time or a threshold number of iterations, the first search is unable to identify a feasible path; determining at least one of a second set of sample layers or second sample nodes to increase a total number of sample nodes; and determining, based at least in part on a second search over the second sample nodes, a second path.

F. The method of any one of paragraphs A-E, wherein the search comprises: determining a set of paths from at least one of the end position or the end layer to the start position, wherein the set of paths is less than all possible paths between the end position or the end layer and the start position; determining that the set of paths comprises a first group of paths and a second group of paths, based at least in part on determining that first distances between the first group of paths are less than a threshold distance and second distances between the second group of paths are less than the threshold distance, wherein the first group comprises the first path; and outputting the first path as a primary path and a second path from the second group as a contingent path.

G. A system comprising: one or more processors; and a memory storing processor-executable instructions that, when executed by the one or more processors, cause the system to perform operations comprising: receiving a route associated with a start position and an end position in an environment; receiving sensor data from a sensor; determining, based at least in part on the sensor data, a data structure identifying whether portions of the environment are occupied; determining, based at least in part on the route, a grid comprising one or more layers along the route, wherein an individual layer of the one or more layers is associated with a portion of the route and comprises a plurality of nodes; selecting, as sample nodes and based at least in part on the grid and the data structure, one or more nodes of the one or more layers; and determining, based at least in part on a search for a set of connections between the sample nodes, a first path between at least one of the end position or an end layer associated with the end position and the start position, wherein the search is based at least in part on the data structure and a set of values associated with one or more motion primitives.

H. The system of paragraph G, wherein the one or more motion primitives and the set of values are precomputed and the search comprises: determining, based at least in part on the set of values, at least one of a first sample node of a first sample layer or one or more sample nodes of one or more sample layers succeeding the first sample layer; determining, as a first cost, a value of the set of values associated with a motion primitive which connects the second sample node of the one or more sample nodes to the first sample node; determining that at least one of the first cost is less than a threshold cost or less than first costs associated with one or more other nodes of the one or more sample layers; determining, based at least in part on the one or more motion primitives, the first sample node, the second sample node, and the occupancy map, that at least one motion primitive is collision-free and connects the first sample node to the second sample node; and determining a second cost associated with the at least one motion primitive and the first sample node.

I. The system of either paragraph G or H, wherein determining the second cost is based at least in part on at least one of: a third cost associated with at least one of a current position or a current pose of the autonomous vehicle; a fourth cost associated with a curvature of the at least one motion primitive; a fifth cost associated with a first distance from at least a portion of the at least one motion primitive to a portion of the occupancy map identified as being occupied; a sixth cost associated with a first difference between the at least one motion primitive and a second motion primitive of a previous connection in the first path; or a seventh cost associated with a second distance of the at least one motion primitive from a lane associated with at least one of the start position, the end position, or a target position.

J. The system of any one of paragraphs G-I, wherein selecting the sample nodes comprises at least one of: selecting, as a sample layer, a first layer of the one or more layers based at least in part on: determining a difference between a first characterization of occupied space indicated by the data structure associated with the first layer and a second characterization of occupied space indicated by the data structure associated with a previous layer, and determining that the difference meets or exceeds a change threshold; or determining one or more of the sample nodes from the first layer based at least in part on a sample rate.

K. The system of any one of paragraphs G-J, wherein: the search is a first search and the sample nodes are first sample nodes; determining the sample nodes is based at least in part on at least one of a first sample rate or a first sensitivity; and the operations further comprise: determining a first total cost associated with the first path; determining that, within a threshold amount of time or a threshold number of iterations, the first search is unable to identify a feasible path; selecting, based at least in part on determining that the first search is unable to identify a feasible path, second sample nodes based at least in part on at least one of a second sample rate or a second sensitivity, wherein the second sample nodes are greater in number than the first sample nodes; and determining, based at least in part on a second search over the second sample nodes, a second path.

L. The system of any one of paragraphs G-K, wherein a feasible path is collision free and associated with a second cost that is less than a second cost threshold.

M. The system of any one of paragraphs G-L, wherein the search comprises: determining a set of paths from at least one of the end position or the end layer to the start position, wherein the set of paths is less than all possible paths between the end position or the end layer to the start position; determining that the set of paths comprises a first group of paths and a second group of paths, based at least in part on determining that first distances between the first group of paths are less than a threshold distance and second distances between the second group of paths are less than the threshold distance, wherein the first group comprises the first path; and outputting the first path as a primary path and a second path from the second group as a contingent path.

N. The system of any one of paragraphs G-M, wherein the operations further comprise identifying the first path as the primary path and the second path as the contingent path based at least in part on determining that at least one of: the first path is at least one of shorter than the second path or is associated with a lower change in curvature than the second path; the first path is associated with a first total cost that is less than first total costs of other paths of the first group; the second path is associated with a second total cost that is less than second total costs of other paths of the second group; or the first total cost is less than the second total cost.

O. A non-transitory computer-readable medium storing processor-executable instructions that, when executed by one or more processors, cause the one or more processors to perform operations comprising: receiving a route associated with a start position and an end position in an environment; receiving a data structure associated with the environment, the data structure identifying occupied space in the environment; determining, based at least in part on the route, a grid comprising one or more layers; determining, as sample nodes and based at least in part on the data structure, one or more nodes of the one or more layers; and determining, based at least in part on a search for a set of contiguous connections between the sample nodes, a first path from at least one of the end position or an end layer associated with the end position to the start position, wherein the search is based at least in part on the data structure, a first set of values associated with differences between a range of positions and orientations and a desired position and orientation, and a second set of values associated with one or more motion primitives, and.

P. The non-transitory computer-readable medium of paragraph O, wherein the one or more motion primitives and the second set of values are precomputed and the search comprises: determining, based at least one of a first sample node of a first sample layer and one or more sample nodes of one or more sample layers succeeding the first sample layer, a motion primitive of the one or more motion primitives; determining, based at least in part on the motion primitive and the first set of values, a first cost associated with a second sample node of the one or more sample nodes; determining that at least one of the first cost is less than a threshold cost or less than first costs associated with one or more other nodes of the one or more sample layers; determining, based at least in part on the one or more motion primitives, the first sample node, the second sample node, and the data structure, that at least one motion primitive is collision-free and connects the first sample node to the second sample node; and determining a second cost based at least in part on the first node, the second node, and the second set of values.

Q. The non-transitory computer-readable medium of either paragraph O or P, wherein determining the second cost is based at least in part on at least one of: a third cost associated with at least one of a current position or a current pose of an autonomous vehicle; a fourth cost associated with a curvature of the at least one motion primitive; a fifth cost associated with a first distance from at least a portion of the at least one motion primitive to a portion of the data structure identified as being occupied; a sixth cost associated with a first difference between the at least one motion primitive and a second motion primitive of a previous connection in the first path; or a seventh cost associated with a second distance of the at least one motion primitive from a lane associated with at least one of the start position, the end position, or a target position.

R. The non-transitory computer-readable medium of any one of paragraphs O-Q, wherein selecting the sample nodes comprises at least one of: selecting, as a sample layer, a first layer of the one or more layers based at least in part on: determining a difference between a first characteristic of space indicated by the data structure associated with the first layer and a second characterization of space indicated by the data structure associated with a previous layer, and determining that the difference meets or exceeds a change threshold; or determining one or more of the sample nodes from the first layer based at least in part on a sample rate.

S. The non-transitory computer-readable medium of any one of paragraphs O-R, wherein: the search is a first search and the sample nodes are first sample nodes; selecting the sample nodes is based at least in part on at least one of a first sample rate or a first sensitivity; and the operations further comprise: determining a first total cost associated with the first path; determining that, within a threshold amount of time or a threshold number of iterations, the first search is unable to identify a feasible path; selecting, based at least in part on determining that the first search is unable to identify a feasible path, second sample nodes based at least in part on at least one of a second sample rate or a second sensitivity, wherein the second sample nodes are greater in number than the first sample nodes; and determining, based at least in part on a second search over the second sample nodes, a second path.

T. The non-transitory computer-readable medium of any one of paragraphs O-S, wherein the search comprises: determining a set of paths from at least one of the end position or the end layer to the start position, wherein the set of paths is less than all possible paths between the end position or the end layer to the start position; determining that the set of paths comprises a first group of paths and a second group of paths, based at least in part on determining that first distances between the first group of paths are less than a threshold distance and second distances between the second group of paths are less than the threshold distance, wherein the first group comprises the first path; and outputting the first path as a primary path and a second path from the second group as a contingent path.

U. The non-transitory computer-readable medium of any one of paragraphs O-T, wherein the operations further comprise identifying the first path as the primary path and the second path as the contingent path based at least in part on determining that at least one of: the first path is at least one of shorter than the second path or is associated with a lower change in curvature than the second path; the first path is associated with a first total cost that is less than first total costs of other paths of the first group; the second path is associated with a second total cost that is less than second total costs of other paths of the second group; or the first total cost is less than the second total cost.

V. The method of any one of paragraphs A-F, further comprising: generating the template movements based at least in part on output from a machine-learned model; and training the machine-learned model based at least in part on: receiving a first training data set comprising a plurality of routes, the plurality of routes comprising an individual route; receiving a second training data set comprising steering commands received from a sensor and associated with at least a portion of the individual route; and training the machine-learned model to map at least one of a curve associated with a route to steering commands.

W. The method of any one of paragraphs A-F or V, wherein: the template movements are first template movements; determining the template movements is based at least in part on a first velocity range; and the method further comprises receiving second template movements based at least in part on a second velocity range.

X. The method of any one of paragraphs A-F, V, or W, wherein determining the path comprises determining a connection between a first node and a second node of the subset of nodes, wherein determining the connection comprises: determining, from among the subset of nodes and based at least in part on the set of possible motions, one or more nodes that are connectable to the second node, wherein the one or more nodes include the first node and are determined from among the subset of nodes; determining, based at least in part on the cost plot, that the first node is associated with a first cost that is at least one of less than a cost threshold or less than first costs associated with the one or more nodes; determining, based at least in part on the potential motions, a first potential motion that connects the first node to the second node; and determining, based at least in part on the first potential motion and the occupancy map, that a connection defined by the first potential motion between the first sample node and the second node is collision-free.

Y. The method of any one of paragraphs A-F or V-X, further comprising determining a second cost associated with at least one of the connection or the potential motion; and adding the connection to the path based at least in part on the second cost.

Z. The method of any one of paragraphs A-F or V-Y, wherein determining the second cost is based at least in part on at least one of: a first cost associated with at least one of a current pose of the autonomous vehicle; a second cost associated with a curvature of one of the template movements that is associated with at least part of the first path; a third cost associated with a first distance from at least a portion of the first path to a portion of the occupancy map identified as being occupied; a fourth cost associated with a first difference between a first template movement identified by a first connection between a first node and a second node and a second template movement identified by a second connection between the second node and a third node, wherein the first connection and the second connection are parts of the first path; a fifth cost associated with a second distance of at least the portion of the first path from a lane associated with at least one of the start position, the end position, or a target position; or a sixth cost associated with a second difference between at least one of a target pose and at least one of a pose associated with an end of the path.

AA. The method of any one of paragraphs A-F or V-Z, further comprising identifying the first path as the primary path and the second path as the contingent path based at least in part on determining that at least one of: the first path is at least one of shorter or smoother than the second path; the first path is associated with a first total cost that is less than first total costs of other paths of the first group; the second path is associated with a second total cost that is less than second total costs of other paths of the second group; or the first total cost is less than the second total cost.

AB. The method of any one of paragraphs A-F or V-AA, wherein: the occupancy map is a first occupancy map; and determining the path comprises a search, the search comprising: determining that a previous path is collision-free based at least in part on the first occupancy map, wherein the previous path was generated based at least in part on a second occupancy map generated previous to the first occupancy map; determining a first total cost associated with the previous path based at least in part on the occupancy map; and selecting the previous path as the first path based at least in part on determining that the first total cost is less than a cost threshold and that the previous path is collision-free.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving a route associated with a start position and an end position in an environment;
   receiving sensor data from a sensor;
   determining, based at least in part on the sensor data, a data structure indicating whether space in the environment is occupied or unoccupied;
   determining, based at least in part on the route, a first grid comprising one or more layers disposed at intervals along the route and defining a plurality of nodes associated with different locations in the environment, wherein the first grid overlays the data structure, the plurality of nodes being regularly spaced along the route;
   determining a subset of nodes based at least in part on the data structure;
   determining, based at least in part on the subset of nodes, a cost plot, and a set of potential motions, a path between the start position and at least one of the end position or an end layer, the cost plot comprising a set of values indicative of costs to move from a range of positions and orientations to a desired position and orientation; and
   controlling an autonomous vehicle based at least in part on the path.

2. The method of claim 1, wherein a potential motion of the set of potential motions is associated with a motion cost, the method further comprising:
   determining, based at least in part on the motion cost, a connection between a first node and a second node of the subset of nodes, wherein the path comprises the connection; and
   determining, based at least in part on the second node and the cost plot, a first cost.

3. The method of claim 1, wherein a potential motion of the set of potential motions is precomputed based at least in part on:
   generating a second grid comprising a plurality of cells, wherein a first cell of the plurality of cells represents a first pose of the autonomous vehicle and a second cell of the plurality of cells represents a second pose of the autonomous vehicle; and
   determining a curve which, when followed by the autonomous vehicle from the first cell to the second cell, will cause the autonomous vehicle to align with the second pose.

4. The method of claim 1, wherein determining the subset of nodes based at least in part on the data structure comprises at least one of:
   determining, as a sample layer, a first layer of the one or more layers based at least in part on determining that a first number of nodes of the first layer associated with first occupied space of the data structure differs from a second number of nodes of a second layer previous to the first layer associated with second occupied space of the data structure; or
   determining, as sample nodes, one or more nodes of the first layer based at least in part on a sample rate.

5. The method of claim 4, wherein:
   determining the path comprises a search;
   the search is a first search, the sample layer is a first sample layer of a first set of sample layers, the sample nodes are first sample nodes, and the sample rate is a first sample rate; and
   the method further comprises:
      determining that, within a threshold amount of time or a threshold number of iterations, the first search is unable to identify a feasible path;
      determining at least one of a second set of sample layers or second sample nodes to increase a total number of sample nodes; and determining, based at least in part on a second search over the second sample nodes, a second path.

6. The method of claim 5, wherein the path is a first path and the search comprises:
determining a set of paths from at least one of the end position or the end layer to the start position, wherein the set of paths is less than all possible paths between the end position or the end layer and the start position;
determining that the set of paths comprises a first group of paths and a second group of paths, based at least in part on determining that first distances between the first group of paths are less than a threshold distance and second distances between the second group of paths are less than the threshold distance, wherein the first group comprises the first path; and
outputting the first path as a primary path and a second path from the second group as a contingent path.

7. A system comprising:
one or more processors; and
a memory storing processor-executable instructions that, when executed by the one or more processors, cause the system to perform operations comprising:
receiving a route associated with a start position and an end position in a region of an environment;
receiving sensor data from a sensor;
determining, based at least in part on the sensor data, an indication of occupied portions of the region;
determining, based at least in part on the route and the occupied portions, a grid comprising one or more layers along the route, wherein:
an individual layer of the one or more layers is associated with a portion of the route and comprises a plurality of nodes and the individual layer is perpendicular to the portion of the route, and
the one or more layers are disposed at intervals along the route in unoccupied portions of the region;
determining, as sample nodes and based at least in part on the grid and the occupied portions, one or more nodes of the one or more layers; and
determining, based at least in part on a search for a set of connections between the sample nodes, a first path between at least one of the end position or an end layer associated with the end position and the start position, wherein the search is based at least in part on the occupied portions and a set of values associated with one or more motion primitives.

8. The system of claim 7, wherein the one or more motion primitives and the set of values are precomputed and the search comprises:
determining, based at least in part on the set of values, at least one of a first sample node of a first sample layer or one or more sample nodes of one or more sample layers succeeding the first sample layer;
determining, as a first cost, a value of the set of values associated with a motion primitive which connects a second sample node of the one or more sample nodes to the first sample node;
determining that at least one of the first cost is less than a threshold cost or less than first costs associated with one or more other nodes of the one or more sample layers;
determining, based at least in part on the one or more motion primitives, the first sample node, the second sample node, and the occupied portions, that at least one motion primitive is collision-free and connects the first sample node to the second sample node; and
determining a second cost associated with the at least one motion primitive and the first sample node.

9. The system of claim 8, wherein determining the second cost is based at least in part on at least one of:
a third cost associated with at least one of a current position or a current pose of an autonomous vehicle;
a fourth cost associated with a curvature of the at least one motion primitive;
a fifth cost associated with a first distance from at least a portion of the at least one motion primitive to a portion of the occupied portions;
a sixth cost associated with a first difference between the at least one motion primitive and a second motion primitive of a previous connection in the first path; or
a seventh cost associated with a second distance of the at least one motion primitive from a lane associated with at least one of the start position, the end position, or a target position.

10. The system of claim 7, wherein determining the sample nodes comprises at least one of:
determining, as a sample layer, a first layer of the one or more layers based at least in part on:
determining a difference between a first characterization of occupied space indicated by the occupied portions associated with the first layer and a second characterization of occupied space indicated by the occupied portions associated with a previous layer, and
determining that the difference meets or exceeds a change threshold; or
determining one or more of the sample nodes from the first layer based at least in part on a sample rate.

11. The system of claim 7, wherein:
the search is a first search and the sample nodes are first sample nodes;
determining the sample nodes is based at least in part on at least one of a first sample rate or a first sensitivity; and
the operations further comprise:
determining a first total cost associated with the first path;
determining that, within a threshold amount of time or a threshold number of iterations, the first search is unable to identify a feasible path;
determining, based at least in part on determining that the first search is unable to identify a feasible path, second sample nodes based at least in part on at least one of a second sample rate or a second sensitivity, wherein the second sample nodes are greater in number than the first sample nodes; and
determining, based at least in part on a second search over the second sample nodes, a second path.

12. The system of claim 11, wherein the feasible path is collision free and associated with a second cost that is less than a second cost threshold.

13. The system of claim 7, wherein the search comprises:
determining a set of paths from at least one of the end position or the end layer to the start position, wherein the set of paths is less than all possible paths between the end position or the end layer to the start position;
determining that the set of paths comprises a first group of paths and a second group of paths, based at least in part on determining that first distances between the first group of paths are less than a threshold distance and second distances between the second group of paths are less than the threshold distance, wherein the first group comprises the first path; and outputting the first path as a primary path and a second path from the second group as a contingent path.

14. The system of claim 13, wherein the operations further comprise identifying the first path as the primary path and the second path as the contingent path based at least in part on determining that at least one of:
the first path is at least one of shorter than the second path or is associated with a lower change in curvature than the second path;
the first path is associated with a first total cost that is less than first total costs of other paths of the first group;
the second path is associated with a second total cost that is less than second total costs of other paths of the second group; or
the first total cost is less than the second total cost.

15. A non-transitory computer-readable medium storing processor-executable instructions that, when executed by one or more processors, cause the one or more processors to perform operations comprising:
receiving a route associated with a start position and an end position in an environment;
receiving a data structure associated with the environment, the data structure identifying occupied space in the environment;
determining, based at least in part on the route, a grid comprising one or more layers, the grid being overlaid over the data structure and shaped based on the route;
determining, as sample nodes and based at least in part on the data structure, one or more nodes of the one or more layers; and
determining, based at least in part on a search for a set of contiguous connections between the sample nodes, a first path from at least one of the end position or an end layer associated with the end position to the start position, wherein the search is based at least in part on the data structure, a first set of values associated with differences between a range of positions and orientations and a desired position and orientation, and a second set of values associated with one or more motion primitives.

16. The non-transitory computer-readable medium of claim 15, wherein the one or more motion primitives and the second set of values are precomputed and the search comprises:
determining, based at least one of a first sample node of a first sample layer and one or more sample nodes of one or more sample layers succeeding the first sample layer, a motion primitive of the one or more motion primitives;
determining, based at least in part on the motion primitive and the first set of values, a first cost associated with a second sample node of the one or more sample nodes;
determining that at least one of the first cost is less than a threshold cost or less than first costs associated with one or more other nodes of the one or more sample layers;
determining, based at least in part on the one or more motion primitives, the first sample node, the second sample node, and the data structure, that at least one motion primitive is collision-free and connects the first sample node to the second sample node; and
determining a second cost based at least in part on the first sample node, the second sample node, and the second set of values.

17. The non-transitory computer-readable medium of claim 16, wherein determining the second cost is based at least in part on at least one of:
a third cost associated with at least one of a current position or a current pose of an autonomous vehicle;
a fourth cost associated with a curvature of the at least one motion primitive;
a fifth cost associated with a first distance from at least a portion of the at least one motion primitive to a portion of the data structure identified as being occupied;
a sixth cost associated with a first difference between the at least one motion primitive and a second motion primitive of a previous connection in the first path; or
a seventh cost associated with a second distance of the at least one motion primitive from a lane associated with at least one of the start position, the end position, or a target position.

18. The non-transitory computer-readable medium of claim 15, wherein selecting the sample nodes comprises at least one of:
determining, as a sample layer, a first layer of the one or more layers based at least in part on:
determining a difference between a first characteristic of space indicated by the data structure associated with the first layer and a second characterization of space indicated by the data structure associated with a previous layer, and
determining that the difference meets or exceeds a change threshold; or
determining one or more of the sample nodes from the first layer based at least in part on a sample rate.

19. The non-transitory computer-readable medium of claim 15, wherein:
the search is a first search and the sample nodes are first sample nodes;
determining the sample nodes is based at least in part on at least one of a first sample rate or a first sensitivity; and
the operations further comprise:
determining a first total cost associated with the first path;
determining that, within a threshold amount of time or a threshold number of iterations, the first search is unable to identify a feasible path;
determining, based at least in part on determining that the first search is unable to identify a feasible path, second sample nodes based at least in part on at least one of a second sample rate or a second sensitivity, wherein the second sample nodes are greater in number than the first sample nodes; and
determining, based at least in part on a second search over the second sample nodes, a second path.

20. The non-transitory computer-readable medium of claim 15, wherein the search comprises:
determining a set of paths from at least one of the end position or the end layer to the start position, wherein the set of paths is less than all possible paths between the end position or the end layer to the start position;
determining that the set of paths comprises a first group of paths and a second group of paths, based at least in part on determining that first distances between the first group of paths are less than a threshold distance and second distances between the second group of paths are less than the threshold distance, wherein the first group comprises the first path; and
outputting the first path as a primary path and a second path from the second group as a contingent path.

21. The non-transitory computer-readable medium of claim 20, wherein the operations further comprise identifying the first path as the primary path and the second path as the contingent path based at least in part on determining that at least one of:
- the first path is at least one of shorter than the second path or is associated with a lower change in curvature than the second path;
- the first path is associated with a first total cost that is less than first total costs of other paths of the first group;
- the second path is associated with a second total cost that is less than second total costs of other paths of the second group; or
- the first total cost is less than the second total cost.

* * * * *